US012521764B2

(12) United States Patent
Shirley et al.

(10) Patent No.: US 12,521,764 B2
(45) Date of Patent: Jan. 13, 2026

(54) METHODS FOR PREPARING PETROLEUM COKE PROPPANT PARTICLES FOR HYDRAULIC FRACTURING

(71) Applicant: ExxonMobil Technology and Engineering Company, Spring, TX (US)

(72) Inventors: Robert M. Shirley, The Woodlands, TX (US); Peter A. Gordon, Yardley, PA (US); Jonathan M. Gieseke, Pinehurst, TX (US); Xiao Jin, Kingwood, TX (US); P. Matthew Spiecker, Manvel, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 0 days.

(21) Appl. No.: 18/747,866

(22) Filed: Jun. 19, 2024

(65) Prior Publication Data

US 2025/0387803 A1 Dec. 25, 2025

(51) Int. Cl.
*B07B 9/00* (2006.01)
*B02C 23/08* (2006.01)

(52) U.S. Cl.
CPC ................ *B07B 9/00* (2013.01); *B02C 23/08* (2013.01)

(58) Field of Classification Search
CPC .................................. B07B 9/00; B02C 2/08
See application file for complete search history.

(56) References Cited

U.S. PATENT DOCUMENTS 1,754,765 A 4/1930 Parr et al.
3,089,542 A 5/1963 Kolodny
(Continued)

FOREIGN PATENT DOCUMENTS

CA 684454 A 4/1964
CA 2863283 A1 3/2015
(Continued)

OTHER PUBLICATIONS

A. Abrams, "Mud Design To Minimize Rock Impairment Due To Particle Invasion", J Pet Technol 29 (05): 586-592, May 1, 1977.
(Continued)

*Primary Examiner* — Michael McCullough
*Assistant Examiner* — Jessica L Burkman
(74) *Attorney, Agent, or Firm* — Troutman Pepper Locke LLP; John A. Morrissett; Scott A. Bergeson

(57) ABSTRACT

A method comprises providing feed petroleum coke particles comprising particles larger than a predetermined threshold size, particles smaller than the threshold size, and optionally petroleum coke microproppant particles, where the predetermined threshold size is greater than 105 μm, and sieving the particles to obtain a first fraction of petroleum coke particles and a second fraction of petroleum coke particles, where at least 75 vol % of the first fraction has particle sizes no smaller than the predetermined threshold size, and substantially all of the second fraction has particle sizes no larger than the threshold particle size, and the second fraction comprises no more than 25 vol % of petroleum coke microproppant particles having sizes no greater than 74 μm. The method comprises size-classifying the second fraction to obtain a petroleum coke proppant particle fraction comprising no more than 10 vol % of petroleum coke microproppant particles having sizes no greater than 74 μm.

32 Claims, 8 Drawing Sheets

900

(56) References Cited

U.S. PATENT DOCUMENTS

| | | | |
|---|---|---|---|
| 3,283,817 | A | 11/1966 | Roberts |
| 3,659,651 | A | 5/1972 | Graham |
| 3,661,543 | A | 5/1972 | Saxton |
| 3,664,420 | A | 5/1972 | Graham et al. |
| 3,700,032 | A | 10/1972 | Terry et al. |
| 3,702,516 | A | 11/1972 | Luckenbach |
| 3,707,462 | A | 12/1972 | Moss |
| 3,759,676 | A | 9/1973 | Lahn |
| 3,816,084 | A | 6/1974 | Moser et al. |
| 4,036,750 | A | 7/1977 | Jaros et al. |
| 4,213,848 | A | 7/1980 | Saxton |
| 4,219,402 | A | 8/1980 | DeGeorge |
| 4,269,696 | A | 5/1981 | Metrailer |
| 4,741,840 | A | 5/1988 | Atherton et al. |
| 4,796,701 | A | 1/1989 | Hudson et al. |
| 4,957,174 | A | 9/1990 | Whitfill et al. |
| 5,189,102 | A | 2/1993 | Tsubuko et al. |
| 5,215,143 | A | 6/1993 | Gentry |
| 5,472,596 | A | 12/1995 | Kerby et al. |
| 5,604,184 | A | 2/1997 | Ellis et al. |
| 5,889,137 | A | 3/1999 | Hutchings et al. |
| 5,899,272 | A | 5/1999 | Loree |
| 6,016,879 | A | 1/2000 | Burts, Jr. |
| 6,035,936 | A | 3/2000 | Whalen |
| 6,059,034 | A | 5/2000 | Rickards et al. |
| 6,283,212 | B1 | 9/2001 | Hinkel et al. |
| 6,330,916 | B1 | 12/2001 | Rickards et al. |
| 6,720,290 | B2 | 4/2004 | England et al. |
| 6,825,152 | B2 | 11/2004 | Green |
| 7,073,581 | B2 | 7/2006 | Nguyen et al. |
| 7,210,528 | B1 | 5/2007 | Brannon et al. |
| 7,237,609 | B2 | 7/2007 | Nguyen |
| 7,249,500 | B2 | 7/2007 | Dutton et al. |
| 7,255,169 | B2 | 8/2007 | van Batenburg et al. |
| 7,270,879 | B2 | 9/2007 | McCrary |
| 7,325,608 | B2 | 2/2008 | van Batenburg et al. |
| 7,334,635 | B2 | 2/2008 | Nguyen |
| 7,337,839 | B2 | 3/2008 | Ayoub et al. |
| 7,424,911 | B2 | 9/2008 | McCarthy et al. |
| 7,450,053 | B2 | 11/2008 | Funk et al. |
| 7,472,751 | B2 | 1/2009 | Brannon et al. |
| 7,494,711 | B2 | 2/2009 | Kaufman et al. |
| 7,521,389 | B2 | 4/2009 | Shmotev et al. |
| 7,527,097 | B2 | 5/2009 | Patel |
| 7,528,096 | B2 | 5/2009 | Brannon et al. |
| 7,541,318 | B2 | 6/2009 | Weaver et al. |
| 7,568,524 | B2 | 8/2009 | Blackburn et al. |
| 7,598,898 | B1 | 10/2009 | Funk et al. |
| 7,612,021 | B2 | 11/2009 | Chatterji et al. |
| 7,648,934 | B2 | 1/2010 | Shmotev et al. |
| 7,669,657 | B2 | 3/2010 | Symington et al. |
| 7,699,106 | B2 | 4/2010 | Brannon et al. |
| 7,703,531 | B2 | 4/2010 | Huang et al. |
| 7,721,803 | B2 | 5/2010 | Huang et al. |
| 7,726,399 | B2 | 6/2010 | Brannon et al. |
| 7,727,940 | B2 | 6/2010 | Reddy et al. |
| 7,735,556 | B2 | 6/2010 | Misselbrook et al. |
| 7,772,163 | B1 | 8/2010 | Brannon et al. |
| 7,789,147 | B2 | 9/2010 | Brannon et al. |
| 7,790,656 | B2 | 9/2010 | Windebank et al. |
| 7,825,053 | B2 | 11/2010 | Duenckel et al. |
| 7,833,947 | B1 | 11/2010 | Kubala |
| 7,841,411 | B2 | 11/2010 | Fuller et al. |
| 7,900,702 | B2 | 3/2011 | Reddy et al. |
| 7,918,277 | B2 | 4/2011 | Brannon et al. |
| 7,954,548 | B2 | 6/2011 | Curimbaba et al. |
| 7,971,644 | B2 | 7/2011 | Ladva et al. |
| 8,003,214 | B2 | 8/2011 | Rediger et al. |
| 8,006,755 | B2 | 8/2011 | Bicerano |
| 8,058,213 | B2 | 11/2011 | Rediger et al. |
| 8,061,427 | B2 | 11/2011 | Jackson et al. |
| 8,063,000 | B2 | 11/2011 | Wilson |
| 8,082,994 | B2 | 12/2011 | Nguyen et al. |
| 8,091,637 | B2 | 1/2012 | Fripp |
| 8,104,537 | B2 | 1/2012 | Kaminsky |
| 8,113,283 | B2 | 2/2012 | Welton et al. |
| 8,127,844 | B2 | 3/2012 | Luharuka et al. |
| 8,127,849 | B2 | 3/2012 | Gupta |
| 8,127,850 | B2 | 3/2012 | Brannon et al. |
| 8,167,043 | B2 | 5/2012 | Willberg et al. |
| 8,178,477 | B2 | 5/2012 | Skala et al. |
| 8,227,026 | B2 | 7/2012 | McDaniel et al. |
| 8,236,737 | B2 | 8/2012 | Fan et al. |
| 8,240,383 | B2 | 8/2012 | Xu et al. |
| 8,281,857 | B2 | 10/2012 | Willberg et al. |
| 8,291,978 | B2 | 10/2012 | Hutchins et al. |
| 8,327,940 | B2 | 12/2012 | Boronin et al. |
| 8,354,939 | B2 | 1/2013 | McDaniel et al. |
| 8,360,149 | B2 | 1/2013 | Hughes et al. |
| 8,361,373 | B1 | 1/2013 | Byron |
| 8,420,578 | B2 | 4/2013 | Usova et al. |
| 8,459,353 | B2 | 6/2013 | Hughes et al. |
| 8,496,057 | B2 | 7/2013 | Ferrero et al. |
| 8,540,024 | B2 | 9/2013 | Kosarev et al. |
| 8,584,755 | B2 | 11/2013 | Willberg et al. |
| 8,596,355 | B2 | 12/2013 | Kaminsky et al. |
| 8,596,361 | B2 | 12/2013 | Willberg et al. |
| 8,596,362 | B2 | 12/2013 | Nelson |
| 8,603,578 | B2 | 12/2013 | Smith et al. |
| 8,607,870 | B2 | 12/2013 | Gu et al. |
| 8,613,314 | B2 | 12/2013 | Garcia-Lopez de Victoria et al. |
| 8,614,157 | B2 | 12/2013 | Pope et al. |
| 8,701,774 | B2 | 4/2014 | Johnson, Sr. |
| 8,739,878 | B2 | 6/2014 | Brannon et al. |
| 8,770,294 | B2 | 7/2014 | Tanguay et al. |
| 8,772,207 | B2 | 7/2014 | Geary et al. |
| 8,869,888 | B2 | 10/2014 | Cramer et al. |
| 8,931,553 | B2 | 1/2015 | Cannan et al. |
| 8,936,083 | B2 | 1/2015 | Nguyen |
| 8,944,164 | B2 | 2/2015 | Veldman et al. |
| 8,959,954 | B2 | 2/2015 | Koseski et al. |
| 8,960,284 | B2 | 2/2015 | Nguyen et al. |
| 8,978,764 | B2 | 3/2015 | Dusseault et al. |
| 8,993,489 | B2 | 3/2015 | McDaniel et al. |
| 9,010,424 | B2 | 4/2015 | Agrawal et al. |
| 9,023,770 | B2 | 5/2015 | Todd et al. |
| 9,080,441 | B2 | 7/2015 | Meurer et al. |
| 9,091,161 | B2 | 7/2015 | Brannon |
| 9,096,790 | B2 | 8/2015 | McCrary et al. |
| 9,097,097 | B2 | 8/2015 | DiFoggio et al. |
| 9,102,867 | B2 | 8/2015 | Parse et al. |
| 9,109,992 | B2 | 8/2015 | Wang |
| 9,140,118 | B2 | 9/2015 | Kulkarni et al. |
| 9,145,513 | B2 | 9/2015 | Pershikova et al. |
| 9,175,210 | B2 | 11/2015 | Eldred et al. |
| 9,175,529 | B2 | 11/2015 | Jamison et al. |
| 9,228,041 | B2 | 1/2016 | Martinez-Castro et al. |
| 9,234,127 | B2 | 1/2016 | De Paiva Cortes et al. |
| 9,234,415 | B2 | 1/2016 | Hughes et al. |
| 9,243,491 | B2 | 1/2016 | McDaniel et al. |
| 9,290,689 | B2 | 3/2016 | Lafitte et al. |
| 9,291,045 | B2 | 3/2016 | Wheeler et al. |
| 9,315,719 | B2 | 4/2016 | Fang et al. |
| 9,322,269 | B2 | 4/2016 | Matherly et al. |
| 9,353,613 | B2 | 5/2016 | Soliman et al. |
| 9,388,334 | B2 | 7/2016 | Hughes et al. |
| 9,458,710 | B2 | 10/2016 | Makarychev-Mikhailov et al. |
| 9,523,268 | B2 | 12/2016 | Potapenko et al. |
| 9,556,376 | B2 | 1/2017 | Huang et al. |
| 9,574,130 | B2 | 2/2017 | Gupta |
| 9,611,423 | B2 | 4/2017 | Zhang et al. |
| 9,631,137 | B2 | 4/2017 | Fuss et al. |
| 9,638,016 | B2 | 5/2017 | Horvath Szabo et al. |
| 9,643,774 | B2 | 5/2017 | Oren |
| 9,650,881 | B2 | 5/2017 | Clem |
| 9,657,219 | B2 | 5/2017 | Rodriguez |
| 9,670,400 | B2 | 6/2017 | Eldred et al. |
| 9,670,762 | B2 | 6/2017 | Nguyen et al. |
| 9,670,763 | B2 | 6/2017 | Fang et al. |
| 9,670,764 | B2 | 6/2017 | Lesko et al. |
| 9,688,905 | B2 | 6/2017 | Nguyen et al. |
| 9,701,589 | B2 | 7/2017 | Schofalvi |
| 9,715,026 | B2 | 7/2017 | Ejofodomi et al. |
| 9,719,011 | B2 | 8/2017 | Tanguay et al. |

(56) References Cited

U.S. PATENT DOCUMENTS 9,732,269 B2 8/2017 Bicerano
9,732,561 B2 8/2017 Carter, Jr.
9,739,122 B2 8/2017 Symington et al.
9,745,841 B2 8/2017 Marino et al.
9,783,727 B2 10/2017 Lahman et al.
9,790,422 B2 10/2017 McDaniel
9,803,135 B2 10/2017 Barron et al.
9,816,364 B2 11/2017 Kruspe et al.
9,845,427 B2 12/2017 Soane et al.
9,845,428 B2 12/2017 Soane et al.
9,850,748 B2 12/2017 Nguyen et al.
9,862,879 B2 1/2018 Chatterjee et al.
9,879,175 B2 1/2018 Aines et al.
9,896,618 B2 2/2018 Huang et al.
9,896,619 B2 2/2018 Nguyen et al.
9,902,899 B2 2/2018 Parse et al.
9,914,872 B2 3/2018 Wehunt et al.
9,920,607 B2 3/2018 Brannon et al.
9,920,610 B2 3/2018 Nelson et al.
9,932,521 B2 4/2018 Soane et al.
9,938,454 B2 4/2018 Tanguay et al.
9,938,811 B2 4/2018 Bestaoui-Spurr et al.
9,944,845 B2 4/2018 Tanguay et al.
9,957,440 B2 5/2018 Nguyen et al.
9,995,125 B2 6/2018 Madasu et al.
10,001,003 B2 6/2018 Dusseault et al.
10,001,769 B2 6/2018 Huang et al.
10,011,763 B2 7/2018 Hartman et al.
10,017,688 B1 7/2018 Green et al.
10,023,791 B1 7/2018 Corcoran et al.
10,060,244 B2 8/2018 Nguyen et al.
10,081,758 B2 9/2018 Dreyer et al.
10,082,013 B2 9/2018 Nguyen et al.
10,087,735 B2 10/2018 Brannon
10,093,849 B2 10/2018 Windebank et al.
10,106,728 B2 10/2018 Dusterhoft et al.
10,106,732 B2 10/2018 Cannan et al.
10,113,106 B2 10/2018 Wadekar
10,113,406 B1 10/2018 Gomaa et al.
10,138,415 B2 11/2018 Bryant et al.
10,150,907 B2 12/2018 Weaver et al.
10,202,836 B2 2/2019 Veldman et al.
10,208,243 B2 2/2019 Burks et al.
10,214,682 B2 2/2019 Nguyen et al.
10,221,660 B2 3/2019 Moeller et al.
10,227,525 B2 3/2019 Monroe et al.
10,233,386 B2 3/2019 Chatterjee et al.
10,240,447 B2 3/2019 Gupta et al.
10,253,250 B2 4/2019 Nguyen et al.
10,266,758 B2 4/2019 Rediger
10,267,133 B2 4/2019 Gullickson et al.
10,267,134 B2 4/2019 Cannan et al.
10,280,363 B2 5/2019 Suzart et al.
10,287,482 B2 5/2019 Ferm et al.
10,287,867 B2 5/2019 Nguyen et al.
10,301,920 B2 5/2019 Green et al.
10,352,145 B2 7/2019 Maxwell et al.
10,364,660 B2 7/2019 Nguyen et al.
10,369,724 B2 8/2019 Ortega Andrade et al.
10,370,586 B2 8/2019 Fitzgerald et al.
10,370,950 B2 8/2019 Gupta et al.
10,400,054 B2 9/2019 Viswanath et al.
10,421,897 B2 9/2019 Skiba et al.
10,428,266 B2 10/2019 Nguyen et al.
10,428,267 B2 10/2019 Cannan et al.
10,457,855 B2 10/2019 Mahmoud et al.
10,457,859 B2 10/2019 Robl et al.
10,458,220 B2 10/2019 Switzer et al.
10,479,704 B2 11/2019 Hayes et al.
10,479,929 B2 11/2019 Gupta
10,519,361 B2 12/2019 Wadekar et al.
10,519,364 B2 12/2019 Stephens et al.
10,538,696 B2 1/2020 Allen et al.
10,538,697 B2 1/2020 Nguyen et al.
10,557,335 B2 2/2020 Potapenko et al.
10,590,265 B2 3/2020 Yalcin et al.
10,590,324 B2 3/2020 Kulkarni et al.
10,590,763 B2 3/2020 Sen et al.
10,611,954 B2 4/2020 Ramos et al.
10,640,388 B2 5/2020 Akbar et al.
10,640,701 B2 5/2020 Montalvo et al.
10,647,907 B2 5/2020 Nguyen et al.
10,647,908 B2 5/2020 Favero
10,647,910 B1 5/2020 Nguyen et al.
10,655,408 B2 5/2020 Goloshchapova
10,655,443 B2 5/2020 Gomaa et al.
10,655,444 B2 5/2020 Nguyen et al.
10,655,466 B2 5/2020 Kabannik
10,661,981 B2 5/2020 Oren et al.
10,689,972 B1 6/2020 Zhao et al.
10,711,564 B2 7/2020 Dusterhoft et al.
10,723,938 B2 7/2020 Johnson, Sr.
10,738,581 B2 8/2020 Nguyen et al.
10,738,582 B2 8/2020 Nguyen et al.
10,738,584 B2 8/2020 Nguyen et al.
10,745,611 B2 8/2020 Nguyen et al.
10,752,828 B2 8/2020 Gomaa et al.
10,767,101 B2 9/2020 Kovalchuk et al.
10,767,104 B2 9/2020 Do et al.
10,793,768 B2 10/2020 Patel et al.
10,801,307 B2 10/2020 Roussel et al.
10,808,167 B2 10/2020 Beuterbaugh et al.
10,808,168 B2 10/2020 Montenegro Galindo et al.
10,808,497 B2 10/2020 Potapenko et al.
10,808,515 B1 10/2020 Sierra et al.
10,815,420 B2 10/2020 Shroff Rama et al.
10,823,646 B1 11/2020 Guo et al.
10,844,280 B2 11/2020 Goyal et al.
10,851,283 B2 12/2020 Potapenko et al.
10,870,792 B2 12/2020 López Reyes et al.
10,876,044 B2 12/2020 Salla et al.
10,882,751 B2 1/2021 Shahsavari et al.
10,900,339 B2 1/2021 Schipper et al.
10,914,139 B2 2/2021 Shahri et al.
10,920,130 B2 2/2021 Nguyen et al.
10,920,558 B2 2/2021 Nguyen et al.
10,934,476 B1 3/2021 Kamavaram et al.
10,941,336 B2 3/2021 Pantsurkin et al.
10,947,447 B2 3/2021 Hendrickson et al.
10,954,430 B2 3/2021 Plishka et al.
10,954,431 B2 3/2021 Chittattukara et al.
10,954,768 B2 3/2021 Gullickson et al.
10,961,444 B1 3/2021 Bestaoui-Spurr et al.
10,975,295 B2 4/2021 Cannan et al.
10,984,156 B2 4/2021 Wu et al.
10,988,674 B2 4/2021 Nguyen et al.
10,988,679 B2 4/2021 Calvin
10,989,034 B2 4/2021 Lin et al.
11,008,506 B2 5/2021 Nguyen et al.
11,008,845 B2 5/2021 Singh et al.
11,014,810 B1 5/2021 De Wit et al.
11,015,437 B2 5/2021 Zhang et al.
11,021,649 B2 6/2021 Bai et al.
11,028,318 B2 6/2021 Cannan et al.
11,078,409 B2 8/2021 Allison
11,104,841 B2 8/2021 Hill et al.
11,111,766 B2 9/2021 Brannon et al.
11,124,696 B2 9/2021 Khamatnurova et al.
11,125,068 B2 9/2021 Jiang et al.
11,142,680 B2 10/2021 Dreyer et al.
11,155,751 B2 10/2021 Bestaoui-Spurr et al.
11,162,022 B2 11/2021 Cannan et al.
11,162,347 B2 11/2021 Yu et al.
11,180,691 B2 11/2021 Sodhi et al.
11,230,660 B2 1/2022 Nguyen et al.
11,236,599 B2 2/2022 Nguyen et al.
11,254,857 B2 2/2022 Cox et al.
11,255,176 B2 2/2022 Nguyen et al.
11,274,243 B2 3/2022 Siddiqui et al.
11,280,172 B2 3/2022 Peng et al.
11,313,211 B2 4/2022 Johnson
11,313,214 B2 4/2022 Nguyen et al.
11,319,482 B2 5/2022 Rahy et al.
11,326,088 B2 5/2022 Todd

(56) References Cited

U.S. PATENT DOCUMENTS

| | | | |
|---|---|---|---|
| 11,339,323 B2 | 5/2022 | Roper et al. | |
| 11,345,848 B2 | 5/2022 | Khamatnurova et al. | |
| 11,352,551 B2 | 6/2022 | Agrawal et al. | |
| 11,365,341 B2 | 6/2022 | Patil et al. | |
| 11,377,581 B2 | 7/2022 | Belakshe et al. | |
| 11,377,944 B2 | 7/2022 | Santra et al. | |
| 11,396,800 B2 | 7/2022 | Madasu et al. | |
| 11,407,932 B2 | 8/2022 | Deysarkar et al. | |
| 11,408,281 B2 | 8/2022 | Lu et al. | |
| 11,414,974 B2 | 8/2022 | Entchev et al. | |
| 11,427,753 B2 | 8/2022 | Ortega Andrade et al. | |
| 11,428,087 B2 | 8/2022 | Nguyen et al. | |
| 11,428,839 B2 | 8/2022 | Mukherjee | |
| 11,434,740 B1 | 9/2022 | Nguyen et al. | |
| 11,441,406 B2 | 9/2022 | Nguyen et al. | |
| 11,447,690 B2 | 9/2022 | Nguyen et al. | |
| 11,447,693 B2 | 9/2022 | Jenkins et al. | |
| 11,459,500 B2 | 10/2022 | Khamatnurova et al. | |
| 11,465,155 B1 * | 10/2022 | Mitchell | B03B 5/04 |
| 11,466,201 B2 | 10/2022 | Smith, Jr. et al. | |
| 11,485,901 B2 | 11/2022 | Shen et al. | |
| 11,486,241 B2 | 11/2022 | Nelson et al. | |
| 11,492,543 B2 | 11/2022 | Gordon et al. | |
| 11,506,584 B2 | 11/2022 | Martysevich et al. | |
| 11,512,025 B2 | 11/2022 | Eldred et al. | |
| 11,535,588 B2 | 12/2022 | Favero et al. | |
| 11,536,125 B1 | 12/2022 | Yang et al. | |
| 11,560,776 B2 | 1/2023 | Madasu | |
| 11,566,488 B2 | 1/2023 | Brandl et al. | |
| 11,566,504 B2 | 1/2023 | Perez et al. | |
| 11,568,111 B2 | 1/2023 | Zhou et al. | |
| 11,578,262 B2 | 2/2023 | Gordon et al. | |
| 11,590,469 B2 | 2/2023 | Cho et al. | |
| 11,591,903 B2 | 2/2023 | Mukherjee | |
| 11,597,872 B2 | 3/2023 | Conkle | |
| 11,608,724 B2 | 3/2023 | Chopade et al. | |
| 11,608,740 B2 | 3/2023 | Moos et al. | |
| 11,613,691 B1 | 3/2023 | Pollock | |
| 11,613,989 B2 | 3/2023 | Zhang et al. | |
| 11,629,284 B1 | 4/2023 | Saini et al. | |
| 11,629,581 B2 | 4/2023 | Cook | |
| 11,643,592 B1 | 5/2023 | Saini et al. | |
| 11,649,398 B1 | 5/2023 | AlTammar et al. | |
| 11,656,002 B2 | 5/2023 | Nevison et al. | |
| 11,661,842 B2 | 5/2023 | Dalamarinis et al. | |
| 11,667,831 B2 | 6/2023 | Liang et al. | |
| 11,667,832 B2 | 6/2023 | Saini et al. | |
| 11,674,074 B2 | 6/2023 | Sherman | |
| 11,692,127 B2 | 7/2023 | Dawson et al. | |
| 11,692,424 B2 | 7/2023 | Nguyen et al. | |
| 11,697,759 B1 | 7/2023 | Dusterhoft et al. | |
| 11,697,760 B2 | 7/2023 | Stover et al. | |
| 11,702,587 B2 | 7/2023 | Li et al. | |
| 11,702,588 B1 | 7/2023 | Saini et al. | |
| 11,713,414 B1 | 8/2023 | Dobson et al. | |
| 11,732,179 B2 | 8/2023 | Vidma et al. | |
| 11,753,584 B2 | 9/2023 | Mazrooee et al. | |
| 11,753,919 B2 | 9/2023 | Velikanov et al. | |
| 11,753,923 B2 | 9/2023 | Dalamarinis | |
| 11,767,466 B2 | 9/2023 | Santra et al. | |
| 11,781,062 B1 | 10/2023 | Liu et al. | |
| 11,781,412 B2 | 10/2023 | Zhang et al. | |
| 11,814,923 B2 | 11/2023 | Sherman et al. | |
| 11,827,845 B2 | 11/2023 | Vigderman et al. | |
| 11,840,911 B2 | 12/2023 | Fan et al. | |
| 11,845,895 B2 | 12/2023 | Montalvo et al. | |
| 11,859,129 B2 | 1/2024 | Uddenburg et al. | |
| 11,859,489 B2 | 1/2024 | Werry et al. | |
| 11,876,398 B1 | 1/2024 | Heath et al. | |
| 11,965,677 B2 | 4/2024 | Cook et al. | |
| 12,037,894 B2 | 7/2024 | Zhang et al. | |
| 2001/0001308 A1 | 5/2001 | Varadaraj et al. | |
| 2004/0014824 A1 | 1/2004 | Leinweber et al. | |
| 2004/0040708 A1 | 3/2004 | Stephenson et al. | |
| 2005/0244641 A1 | 11/2005 | Vincent | |
| 2005/0274523 A1 | 12/2005 | Brannon et al. | |
| 2006/0073980 A1 | 4/2006 | Brannon et al. | |
| 2006/0175059 A1 | 8/2006 | Sinclair et al. | |
| 2006/0272816 A1 | 12/2006 | Willberg et al. | |
| 2008/0135246 A1 | 6/2008 | Canova et al. | |
| 2008/0156489 A1 | 7/2008 | Pershikova et al. | |
| 2009/0038797 A1 | 2/2009 | Skala et al. | |
| 2009/0038799 A1 | 2/2009 | Garcia-Lopez de Victoria et al. | |
| 2009/0075847 A1 | 3/2009 | Wawrzos et al. | |
| 2009/0283447 A1 | 11/2009 | D'Elia et al. | |
| 2010/0179077 A1 | 7/2010 | Turakhia et al. | |
| 2010/0263865 A1 | 10/2010 | Willberg et al. | |
| 2011/0082033 A1 | 4/2011 | Frohs et al. | |
| 2011/0111990 A1 | 5/2011 | Pershikova et al. | |
| 2011/0118155 A1 | 5/2011 | Pisklak et al. | |
| 2012/0043080 A1 | 2/2012 | Edwards | |
| 2012/0088699 A1 | 4/2012 | Qin | |
| 2012/0241168 A1 | 9/2012 | Pei et al. | |
| 2012/0267102 A1 | 10/2012 | Huang et al. | |
| 2013/0025867 A1 | 1/2013 | Sun et al. | |
| 2014/0014338 A1 | 1/2014 | Crews et al. | |
| 2014/0096952 A1 | 4/2014 | Hocking | |
| 2014/0196898 A1 | 7/2014 | Tanguay et al. | |
| 2014/0209390 A1 | 7/2014 | Jamison et al. | |
| 2014/0353042 A1 | 12/2014 | Karale et al. | |
| 2015/0167437 A1 | 6/2015 | Dawson | |
| 2015/0211346 A1 * | 7/2015 | Potapenko | E21B 43/26 166/280.1 |
| 2015/0233226 A1 | 8/2015 | Holzhauser et al. | |
| 2015/0247084 A1 | 9/2015 | Epstein | |
| 2015/0292279 A1 | 10/2015 | Wang | |
| 2015/0361331 A1 | 12/2015 | Tanguay et al. | |
| 2016/0137910 A1 | 5/2016 | Chang et al. | |
| 2016/0215205 A1 | 7/2016 | Nguyen et al. | |
| 2016/0312126 A1 | 10/2016 | Wormsbecker et al. | |
| 2016/0319185 A1 | 11/2016 | Semenov et al. | |
| 2016/0326300 A1 | 11/2016 | Gelves et al. | |
| 2016/0340573 A1 | 11/2016 | Semenov et al. | |
| 2017/0145302 A1 | 5/2017 | Qin et al. | |
| 2017/0198209 A1 | 7/2017 | Stephenson et al. | |
| 2017/0321105 A1 | 11/2017 | McDaniel et al. | |
| 2018/0066179 A1 | 3/2018 | Nguyen et al. | |
| 2018/0282222 A1 | 10/2018 | Khan | |
| 2018/0339946 A1 | 11/2018 | öttinger et al. | |
| 2019/0016944 A1 | 1/2019 | Eldred et al. | |
| 2019/0048146 A1 | 2/2019 | Dei Santi et al. | |
| 2019/0112520 A1 | 4/2019 | Knoer et al. | |
| 2019/0194549 A1 | 6/2019 | Dubois et al. | |
| 2019/0241789 A1 | 8/2019 | Agapiou et al. | |
| 2019/0330520 A1 | 10/2019 | Cannan et al. | |
| 2020/0131431 A1 | 4/2020 | Russum | |
| 2020/0157415 A1 | 5/2020 | Quintero et al. | |
| 2020/0208047 A1 | 7/2020 | Gordon et al. | |
| 2020/0306710 A1 | 10/2020 | Cho et al. | |
| 2020/0370405 A1 | 11/2020 | Nguyen et al. | |
| 2021/0002994 A1 | 1/2021 | Zhou et al. | |
| 2021/0087459 A1 | 3/2021 | Patil et al. | |
| 2021/0131261 A1 | 5/2021 | Wang et al. | |
| 2021/0207465 A1 | 7/2021 | Nguyen et al. | |
| 2021/0229049 A1 | 7/2021 | Mazrooee et al. | |
| 2021/0246364 A1 | 8/2021 | Gordon et al. | |
| 2021/0253943 A1 | 8/2021 | Ghosh et al. | |
| 2021/0253944 A1 | 8/2021 | Gordon et al. | |
| 2021/0317733 A1 | 10/2021 | Downey | |
| 2021/0340432 A1 | 11/2021 | Bhaduri et al. | |
| 2022/0090475 A1 | 3/2022 | Radwan | |
| 2022/0112422 A1 | 4/2022 | Liang et al. | |
| 2022/0169915 A1 | 6/2022 | Barron et al. | |
| 2022/0186605 A1 | 6/2022 | Quan et al. | |
| 2022/0340809 A1 | 10/2022 | Li et al. | |
| 2022/0349801 A1 | 11/2022 | Al-Boghail et al. | |
| 2023/0085175 A1 | 3/2023 | Smalls et al. | |
| 2023/0119075 A1 | 4/2023 | Hall et al. | |
| 2023/0123954 A1 | 4/2023 | Maity et al. | |
| 2023/0132325 A1 | 4/2023 | Gordon et al. | |
| 2023/0134440 A1 | 5/2023 | Decker et al. | |
| 2023/0147476 A1 | 5/2023 | Wheelock et al. | |
| 2023/0167354 A1 | 6/2023 | Stojkovic et al. | |
| 2023/0174848 A1 | 6/2023 | Uddenburg et al. | |

(56) References Cited

U.S. PATENT DOCUMENTS

| | | | |
|---|---|---|---|
| 2023/0175377 | A1 | 6/2023 | Nedwed et al. |
| 2023/0183561 | A1 | 6/2023 | Carroll et al. |
| 2023/0203362 | A1 | 6/2023 | Calvin |
| 2023/0229830 | A1 | 7/2023 | Zhao et al. |
| 2023/0257646 | A1 | 8/2023 | Robl et al. |
| 2023/0279285 | A1 | 9/2023 | Shirley |
| 2023/0279286 | A1 | 9/2023 | Gordon et al. |
| 2023/0303911 | A1 | 9/2023 | Radwan |
| 2023/0334199 | A1 | 10/2023 | Lu et al. |
| 2024/0110471 | A1 | 4/2024 | Zhang et al. |
| 2024/0228866 | A1 | 7/2024 | Shirley et al. |
| 2024/0228867 | A1 | 7/2024 | Stojkovic et al. |
| 2025/0236785 | A1 | 7/2025 | Shirley et al. |
| 2025/0236786 | A1 | 7/2025 | Gordon et al. |
| 2025/0236787 | A1 | 7/2025 | Benish et al. |
| 2025/0237126 | A1 | 7/2025 | Jin et al. |
| 2025/0237127 | A1 | 7/2025 | Lee et al. |
| 2025/0237128 | A1 | 7/2025 | Shirley et al. |
| 2025/0237129 | A1 | 7/2025 | Shirley et al. |
| 2025/0237130 | A1 | 7/2025 | Becerril et al. |
| 2025/0263599 | A1 | 8/2025 | Gordon et al. |

FOREIGN PATENT DOCUMENTS

| | | | |
|---|---|---|---|
| CN | 203319922 | U | 12/2013 |
| CN | 109236262 | A | 8/2020 |
| CN | 109751029 | B | 10/2021 |
| PL | 234113 | B1 | 3/2018 |
| PL | 234114 | B1 | 11/2018 |
| WO | 2007141519 | A2 | 12/2007 |
| WO | 2008033225 | A2 | 3/2008 |
| WO | 2011163529 | A1 | 12/2011 |
| WO | 2012040025 | A2 | 3/2012 |
| WO | 2012051026 | A2 | 4/2012 |
| WO | 2012104582 | A1 | 8/2012 |
| WO | 2013059793 | A2 | 4/2013 |
| WO | 2013119507 | A1 | 8/2013 |
| WO | 2013158308 | A1 | 10/2013 |
| WO | 2013176977 | A1 | 11/2013 |
| WO | 2014039968 | A1 | 3/2014 |
| WO | 2014172953 | A1 | 10/2014 |
| WO | 2014172955 | A1 | 10/2014 |
| WO | 2015021523 | A1 | 2/2015 |
| WO | 2015031415 | A2 | 3/2015 |
| WO | 2015041690 | A1 | 3/2015 |
| WO | 2016033533 | A1 | 3/2016 |
| WO | 2016054022 | A1 | 4/2016 |
| WO | 2016074075 | A1 | 5/2016 |
| WO | 2016168719 | A1 | 10/2016 |
| WO | 2018001748 | A1 | 1/2018 |
| WO | 2018094123 | A1 | 5/2018 |
| WO | 2019164694 | A1 | 8/2019 |
| WO | 2019199431 | A1 | 10/2019 |
| WO | 2019/222034 | A1 | 11/2019 |
| WO | 2020131122 | A1 | 6/2020 |
| WO | 2020139472 | A1 | 7/2020 |
| WO | 2020185373 | A1 | 9/2020 |
| WO | 2021030287 | A1 | 2/2021 |
| WO | 2022232715 | A1 | 11/2022 |
| WO | 2022241338 | A1 | 11/2022 |
| WO | 2022241339 | A1 | 11/2022 |
| WO | 2023040535 | A1 | 3/2023 |
| WO | 2024/102224 | A1 | 5/2024 |
| WO | 2024131192 | A1 | 6/2024 |
| WO | 2025/155374 | A1 | 7/2025 |

OTHER PUBLICATIONS

Alvarez et al., "Wettability Alteration and Spontaneous Imbibition in Unconventional Liquid Reservoirs by Surfactant Additives", SPE Res 4:21): 107-117, Jun. 28, 2016.

Alzanam et al., "A Multiwalled Carbon Nanotube-Based Polyurethane Nanocomposite-Coated Sand/Proppant for Improved Mechanical Strength and Flowback Control in Hydraulic Fracturing Applications", ACS Omega, vol. 6, Issue 32, Aug. 5, 2021.

Arshadi et al., "Proppant-packed fractures in shale gas reservoirs: An in-situ investigation of deformation, wettability, and multiphase flow effects", Journal of Natural Gas Science and Engineering, vol. 59, Nov. 2018.

Arshadi et al., "The effect of deformation on two-phase flow through proppant-packed fractured shale samples: A micro-scale experimental investigation", Advances in Water Resources, vol. 105, Jul. 2017.

Calvin et al., "Enhancement of Well Production in the SCOOP Woodford Shale through the Application of Microproppant", Paper presented at the SPE Hydraulic Fracturing Technology Conference and Exhibition, The Woodlands, Texas, USA, Jan. 24, 2017.

Dahl et al., "Application of Micro-Proppant to Enhance Well Production in Unconventional Reservoirs: Laboratory and Field Results", Paper presented at the SPE Western Regional Meeting, Garden Grove, California, USA, Apr. 27, 2015.

Dong et al., "Effect of surface wettability of ceramic proppant on oil flow performance in hydraulic fractures", Energy Science & Engineering, vol. 7, issue 2, Feb. 19, 2019.

Edward Furimsky, "Characterization of cokes from fluid/flexi-coking of heavy feeds", Fuel Processing Technology, vol. 67, No. 3, 205-230, XP055559715, Sep. 1, 2000, 5 pages.

Elkhatib et al., "Pore-Scale Study of Wettability Alteration and Fluid Flow in Propped Fractures of Ultra-Tight Carbonates", Langmuiir, Colume 39 Issue 5, Jan. 24, 2023.

Go et al., "Evaluation of Coated Proppant Unconventional Performance", Energy & Fuels, vol. 35, Issue 11, May 17, 2021.

Huang et al., "Effects of Proppant Wettability and Size on Transport and Retention of Coal Fines in Saturated Proppant Packs: Experimental and Theoretical Studies", Energy Fuels 2021, 35, 15, 11976-11991, Jul. 7, 2021.

International Search Report and the Written Opinion of the International Searching Authority, mailed Jun. 13, 2022, International Application No. PCT/US2022/070811, 10 pages.

International Search Report and the Written Opinion of the International Searching Authority, mailed Jun. 13, 2022, International Application No. PCT/US2022/070776, 10 pages.

International Search Report and the Written Opinion of the International Searching Authority, mailed May 19, 2023, International Application No. PCT/US2023/062816, 10 pages.

Jackson et al., "Stimulation Design and Treatment in the Sycamore Formation of the South Central Oklahoma Oil Province Area of the Anadarko Basin", Paper presented at the SPE Hydraulic Fracturing Technology Conference and Exhibition, The Woodlands, Texas, USA, Jan. 23, 2018.

Kumar et al., "The Role of Micro-Proppants in Conductive Fracture Network Development", Paper presented at the SPE Hydraulic Fracturing Technology Conference and Exhibition, The Woodlands, Texas, USA, Jan. 29, 2019.

Labus K. et al., "IOP Conference Series: Earth and Environmental Science Paper @Bullet Open Access The concept of coke based proppants for coal bed fracturing", XP055798892, Dec. 31, 2019, 12 pages.

Lau et al., "Maximizing Production from Shale Reservoir by Using Micro-Sized Proppants", Paper presented at the International Petroleum Technology Conference, Beijing, China, Mar. 22, 2019.

Le et al., "Methane foam performance in oil-wet unconsolidated porous media: A systematic experimental investigation at reservoir conditions", Fuel, vol. 344, Jul. 15, 2023.

Liao et al., "Lightweight proppants in unconventional oil and natural gas development: A review", Sustainable Materials and Technologies, vol. 33, Sep. 2022.

Mishra Debesh Devadutta, "Thermal Analysis of Polyethylene Terephthalate (PET)—Coke Composites Prepared by Mechanical Alloying Technique", XP055926292, DOI: 10.20944/preprints201608.0099.vl, Aug. 2, 2016, 21 pages.

Montgomery et al., "Utilizing Discrete Fracture Modeling and Microproppant to Predict and Sustain Production Improvements in Nano Darcy Rock", Paper presented at the SPE Hydraulic Fracturing Technology Conference and Exhibition, The Woodlands, Texas, USA, Jan. 28, 2020.

(56) References Cited

OTHER PUBLICATIONS

Ngata et al., "Review of Developments in Nanotechnology Application for Formation Damage Control", Energy & Fuels, vol. 36, Issue 1, Dec. 27, 2021.
Palisch et al., "Initial Observations From a Bakken Microproppant Field Trial", Paper presented at the SPE Hydraulic Fracturing Technology Conference and Exhibition, The Woodlands, Texas, USA, Jan. 24, 2023.
Radwan et al., "An Engineered Microparticles-Based Slurry Pumped in Over 10,000 Stages Provided Notable Operational and Production Improvements in Challenging Formations", Paper presented at the SPE Annual Technical Conference and Exhibition, Houston, Texas, USA, Sep. 26, 2022.
Tabatabaei et al., "Surface Modification of Proppant Using Hydrophobic Coating To Enhance Long-Term Production", SPE Production & Operations, vol. 36, Issue 1, Feb. 10, 2021.
Wang et al., "Effect of Fluid Contact Angle of Oil-Wet Fracture Proppant on the Competing Water/Oil Flow in Sandstone-Proppant Systems", Sustainability, Mar. 23, 2022.
Wang et al., "Experimental and numerical investigations of water-oil two-phase flow in fractures with proppants of different wetting properties", Journal of Petroleum Science and Engineering, vol. 214, Jul. 2022.
Wu et al., "An Experimental Investigation of the Conductivity of Unpropped Fractures in Shales", Paper presented at the SPE Hydraulic Fracturing Technology Conference and Exhibition, The Woodlands, Texas, USA, Jan. 24, 2017.
Xiao et al., "Effect of surface wetting behavior of ceramic proppant on the two-phase flow across the interface of sandstone and fracture", Energy Science & Engineering, vol. 8 issue 4, Dec. 19, 2019.
Chang, F.F., Berger, P.D., Lee C.H., "In-Situ Formation of Proppant and Highly Permeable Blocks for Hydraulic Fracturing", SPE-173328-MS, presented at SPE Hydraulic Fracturing Technology Conference, Woodlands, TX Feb. 3-5, 2015. Abstract.
International Search Report and the Written Opinion of the International Searching Authority, mailed Feb. 28, 2025, International Application No. PCT/US2024/056651, 9 pages.
International Search Report and the Written Opinion of the International Searching Authority, mailed Feb. 17, 2025, International Application No. PCT/US2024/056647, 12 pages.
International Search Report and the Written Opinion of the International Searching Authority, mailed Feb. 17, 2025, International Application No. PCT/US2024/056648, 15 pages.
International Search Report and the Written Opinion of the International Searching Authority, mailed Feb. 17, 2025, International Application No. PCT/US2024/056649, 13 pages.
International Search Report and the Written Opinion of the International Searching Authority, mailed Feb. 24, 2025, International Application No. PCT/US2024/056652, 12 pages.
International Search Report and Written Opinion, dated Apr. 27, 2021 issued in related PCT Application No. PCT/US2021/015152, 12 pages.
International Search Report and Written Opinion, dated Apr. 27, 2021 issued in related PCT Application No. PCT/US2021/015153, 11 pages.
International Search Report and Written Opinion, dated Jun. 18, 2023 issued in related PCT Application No. PCT/US2023/063275, 9 pages.
International Search Report and the Written Opinion of the International Searching Authority, mailed Jun. 10, 2025, International Application No. PCT/US2025/019906, 13 pages.
International Search Report and the Written Opinion of the International Searching Authority, mailed Jun. 10, 2025, International Application No. PCT/US2025/019904, 12 pages.
International Search Report and the Written Opinion of the International Searching Authority, mailed Aug. 18, 2025, International Application No. PCT/US2025/029606, 11 pages.
International Search Report and the Written Opinion of the International Searching Authority, mailed Aug. 25, 2025, International Application No. PCT/US2025/029589, 9 pages.
International Search Report and the Written Opinion of the International Searching Authority, mailed Oct. 2, 2025, International Application No. PCT/US2025/056652, 14 pages.
Harris L. S., "Fume Scrubbing With the Ejector Venturi System", Chemical Engineering Progress, vol. 62, No. 4, Apr. 30, 1966, XP002106911, ISSN: 0360-7275.

* cited by examiner

900

1000

METHODS FOR PREPARING PETROLEUM COKE PROPPANT PARTICLES FOR HYDRAULIC FRACTURING

FIELD

This disclosure relates generally to the field of hydraulic fracturing operations and the fracturing fluids and proppant particles employed therein. More specifically, this disclosure relates to methods for preparing petroleum coke proppant particles for hydraulic fracturing.

BACKGROUND

This section is intended to introduce various aspects of the art, which may be associated with aspects and embodiments of the present disclosure. This discussion is believed to assist in providing a framework to facilitate a better understanding of particular aspects and embodiments of the present disclosure. Accordingly, it should be understood that this section should be read in this light, and not necessarily as admissions of prior art.

A wellbore can be drilled into a subterranean formation to promote the removal of a desired resource, such as hydrocarbons, coal, minerals, water, and the like, from the subterranean formation. In many cases, the subterranean formation needs to be stimulated in some manner to promote the removal of the resource. Stimulation can include any operation performed upon the matrix of a subterranean formation to improve fluid conductivity therethrough, including hydraulic fracturing, which is commonly used for unconventional reservoirs.

Hydraulic fracturing typically involves the pumping of large quantities of fracturing fluid into the subterranean formation (e.g., a low-permeability subterranean formation) under high hydraulic pressure to promote the creation of one or more fractures within the matrix of the subterranean formation and to create high-conductivity flow paths. Primary fractures extending from the wellbore and, in some instances, secondary fractures extending from the primary fractures are formed during a hydraulic fracturing operation. These fractures may be vertical, horizontal, or a combination of directions forming a tortuous path.

Proppant particles are often included in the fracturing fluid. Once the fracturing fluid has been pumped into the formation, it is desired that such proppant particles could be transported into the fractures and settle therein. Upon pressure release, the proppant particles remaining in the fractures keep the fractures open by preventing them from collapsing, facilitating the flow of the desired resource from the fractured formation into the wellbore through the propped fractures. The performance of the proppant can affect the recovery of the desired resource significantly.

Sand has been traditionally used as a proppant in hydraulic fracturing for the production of hydrocarbon fluids from unconventional subterranean formations. Various other types of proppants have been proposed and are available to substitute sand. Nonetheless, all these existing proppants suffer from one of more drawbacks, such as high cost and/or limited hydrocarbon recovery rate. Thus, there is a genuine need of high-performance proppants in the industry. This disclosure satisfies these and other needs.

SUMMARY

An aspect of the present disclosure provides a method for preparing petroleum coke proppant particles for hydraulic fracturing. The method can comprise providing feed petroleum coke particles comprising particles larger than a predetermined threshold size, particles smaller than the predetermined threshold size, and optionally petroleum coke microproppant particles, where the predetermined threshold size is greater than 105 μm. The method can also comprise sieving the feed petroleum coke particles to obtain a first fraction of petroleum coke particles and a second fraction of petroleum coke particles, where at least 75 vol % of the first fraction has particle sizes no smaller than the predetermined threshold size, based on the total volume of the petroleum coke particles in the first fraction, and substantially all of the second fraction has particle sizes no larger than the threshold particle size, and the second fraction comprises no more than 25 vol % of petroleum coke microproppant particles having particle sizes no greater than 74 μm, based on the total volume of the petroleum coke particles in the second fraction. The method can further comprise size-classifying the second fraction of petroleum coke particles to obtain a petroleum coke proppant particle fraction comprising no more than 10 vol % of petroleum coke microproppant particles having particle sizes no greater than 74 μm, based on the total volume of the petroleum coke proppant particle fraction.

Another aspect of the present disclosure provides another method for preparing petroleum coke proppant particles for hydraulic fracturing. The method can include providing dry petroleum coke comprising particles larger than 297 μm and grinding the dry petroleum coke to obtain ground petroleum coke particles. The method can also comprise sieving the ground petroleum coke particles to obtain a first fraction of petroleum coke particles and a second fraction of petroleum coke particles, where at least 75 vol % of the first fraction has particle sizes of at least 297 μm, based on the total volume of the first fraction, and substantially all of the second fraction has particles sizes of at most 297 μm, and the second fraction comprises no more than 25 vol % of petroleum coke microproppant particles, based on the total volume of the second fraction. The method can further comprise elutriating the second fraction of petroleum coke particles to obtain a petroleum coke proppant particle fraction and a third fraction of petroleum proppant particles, where the petroleum coke proppant particle fraction has particle sizes ranging from greater than 105 μm to at most 297 μm, the petroleum coke proppant particle fraction comprises at most 10 vol % of petroleum coke microproppant particles, based on the total volume of the petroleum coke proppant particle fraction, and substantially all of the third fraction has particle sizes of at most 105 μm.

These and other features and attributes of the disclosed aspects and embodiments of the present disclosure and their advantageous applications and/or uses will be apparent from the detailed description that follows.

BRIEF DESCRIPTION OF THE DRAWINGS

To assist those of ordinary skill in the relevant art in making and using the subject matter described herein, reference is made to the appended drawings, where.

Figure 1:
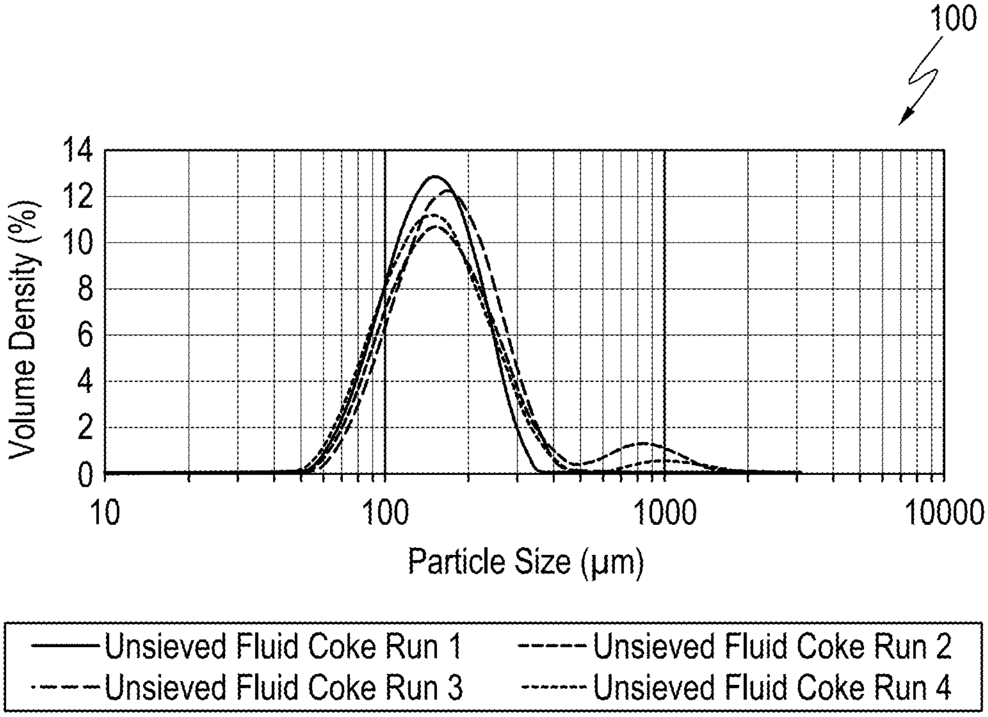
FIG. 1 is a graph showing particle sizes for four unsieved fluid coke samples.

It should be noted that the figures are merely examples of the present disclosure and are not intended to impose limitations on the scope of the present disclosure. Further, the figures are generally not drawn to scale, but are drafted for purposes of convenience and clarity in illustrating various aspects of the present disclosure.

DETAILED DESCRIPTION

In the following detailed description section, the specific examples of the present disclosure are described in connection with preferred aspects and embodiments. However, to the extent that the following description is specific to one or more aspects or embodiments of the present disclosure, this is intended to be for exemplary purposes only and simply provides a description of such aspect(s) or embodiment(s). Accordingly, the present disclosure is not limited to the specific aspects and embodiments described below, but rather, includes all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition those skilled in the art have given that term as reflected in at least one printed publication or issued patent. Further, the present disclosure is not limited by the usage of the terms shown below, as all equivalents, synonyms, new developments, and terms or processes that serve the same or a similar purpose are considered to be within the scope of the present claims.

In this disclosure, a process is described as comprising at least one "step." It should be understood that each step is an action or operation that may be carried out once or multiple times in the process, in a continuous or discontinuous fashion. Unless specified to the contrary or the context clearly indicates otherwise, multiple steps in a process may be conducted sequentially in the order as they are listed, with or without overlapping with one or more other steps, or in any other order, as the case may be. In addition, one or more or even all steps may be conducted simultaneously with regard to the same or different batch of material. For example, in a continuous process, while a first step in a process is being conducted with respect to a raw material just fed into the beginning of the process, a second step may be carried out simultaneously with respect to an intermediate material resulting from treating the raw materials fed into the process at an earlier time in the first step. Preferably, the steps are conducted in the order described.

Unless otherwise indicated, all numbers indicating quantities in this disclosure are to be understood as being modified by the term "about" in all instances. It should also be understood that the precise numerical values used in the specification and claims constitute specific embodiments. Efforts have been made to ensure the accuracy of the data in the examples. However, it should be understood that any measured data inherently contains a certain level of error due to the limitation of the technique and/or equipment used for acquiring the measurement.

As used herein, the singular forms "a," "an," and "the" mean one or more when applied to any embodiment described herein. The use of "a," "an," and/or "the" does not limit the meaning to a single feature unless such a limit is specifically stated.

The terms "about" and "around" mean a relative amount of a material or characteristic that is sufficient to provide the intended effect. The exact degree of deviation allowable in some cases may depend on the specific context, e.g., +1%, +5%, +10%, +15%, etc. It should be understood by those of skill in the art that these terms are intended to allow a description of certain features described and claimed without restricting the scope of these features to the precise numerical ranges provided. Accordingly, these terms should be interpreted as indicating that insubstantial or inconsequential modifications or alterations of the subject matter described are considered to be within the scope of the disclosure.

The term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "including," may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the term "any" means one, some, or all of a specified entity or group of entities, indiscriminately of the quantity.

As used herein, the term "apparent density," with reference to the density of proppant particles, refers to the density of the individual particles themselves, which may be expressed in grams per cubic centimeter (g/cm$^3$ or g/cc). The apparent density values provided herein are based on the American Petroleum Institute's Recommended Practice 19C (hereinafter "API RP-19C") standard, entitled "Measurement of Properties of Proppants Used in Hydraulic Fracturing and Gravel-packing Operations" (First Ed. May 2008, Reaffirmed June 2016).

The phrase "at least one," when used in reference to a list of one or more entities (or elements), should be understood to mean at least one entity selected from any one or more of the entities in the list of entities, but not necessarily including at least one of each and every entity specifically listed within the list of entities, and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently, "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the term "delayed coke" refers to the solid concentrated carbon material that is produced within delayed coking units via the delayed coking process. According to the delayed coking process, a preheated feedstock is introduced into a fractionator, where it undergoes a thermal cracking process in which long-chain hydrocarbons are split into shorter-chain hydrocarbons. The resulting lighter fractions are then removed as sidestream products. The fractionator bottoms, which include a recycle stream of heavy product, are heated in a furnace, which can have an outlet temperature of, e.g., around 895° F. to around 960° F. The heated feedstock then enters a reactor, often referred to as a "coke drum," which can operate at temperatures of, e.g., around 780° F. to around 840° F. Within the coke drum, the cracking reactions continue. The resulting cracked products then exit the coke drum as an overhead stream, while coke deposits in the coke drum. In general, this process is continued for a period of around 16 hours to around 24 hours to allow the coke drum to fill with coke. In addition, to allow the delayed coking unit to operate on a batch-continuous (or semi-continuous) basis, two or more coke drums are used. While one coke drum is on-line filling with coke, another coke drum can be steam-stripped, cooled, decoked (e.g., via hydraulically cutting the deposited coke with water), pressure-checked, and warmed up. Moreover, the overhead stream exiting the coke drum enters the fractionator, where naphtha and heating oil fractions are recovered. The heavy recycle material is then typically combined with preheated fresh feedstock and recycled back into the process.

As used herein, the terms "example," exemplary," and "embodiment," when used with reference to one or more components, features, structures, or methods according to the present disclosure, are intended to convey that the described component, feature, structure, or method is an illustrative, non-exclusive example of components, features, structures, or methods according to the present disclosure. Thus, the described component, feature, structure, or method is not intended to be limiting, required, or exclusive/exhaustive; and other components, features, structures, or methods, including structurally and/or functionally similar and/or equivalent components, features, structures, or methods, are also within the scope of the present disclosure.

As used herein, the term "flexicoke" refers to the solid concentrated carbon material produced via the FLEXICOKING™ process, which is a thermal cracking process utilizing fluidized solids and gasification for the conversion of heavy, low-grade hydrocarbon feeds into lighter hydrocarbon products (e.g., upgraded, more valuable hydrocarbons). Briefly, the FLEXICOKING™ process integrates a cracking reactor, a heater, and a gasifier into a common fluidized-solids (coke) circulating system. A feed stream (of residua) is fed into a fluidized bed, along with a stream of hot recirculating material to the reactor. From the reactor, a stream containing coke is circulated to the heater vessel, where it is heated. The hot coke stream is sent from the heater to the gasifier, where it reacts with air and steam. The gasifier product gas, referred to as coke gas, containing entrained coke particles, is returned to the heater and cooled by cold coke from the reactor to provide a portion of the reactor heat requirement, which is typically in a range from around 496° C. to around 538° C. A return stream of coke sent from the gasifier to the heater provides the remainder of the heat requirement. The coke meeting the heat requirement is then circulated to the reactor, and the feed stream is thermally cracked to produce light hydrocarbon liquids that are removed from the reactor and recovered using conventional fractionating equipment. Fluid coke is formed from the thermal cracking process and settles (deposits) onto the "seed" fluidized bed coke already present in the reactor. The resultant at least partially gasified coke is flexicoke. In some instances, the coke from the thermal cracking process deposits in a pattern that appears ring-like atop the surface of the seed coke. Flexicoke is continuously withdrawn from the system during normal FLEXICOKING™ processing (e.g., from the reactor or after it is streamed to the heater via an elutriator) to ensure that the system maintains particles of coke in a fluidizable particle size range. Accordingly, flexicoke is a readily available byproduct of the FLEXICOKING™ process.

Relatedly, the terms "wet flexicoke fines" and "dry flexicoke fines" refer to two byproducts of the FLEXICOKING™ process. Such byproducts are collected as particles that were not recovered in the secondary cyclones of the heater. More specifically, the particles are collected first in the tertiary cyclone as dry flexicoke fines, and the smaller particles that travel past the tertiary cyclone are then recovered in the venturi scrubber as wet flexicoke fines.

As used herein, the term "fluid coke" refers to the solid concentrated carbon material remaining from fluid coking. The term "fluid coking" refers to a thermal cracking process utilizing fluidized solids for the conversion of heavy, low-grade hydrocarbon feeds into lighter products (e.g., upgraded hydrocarbons), producing fluid coke as a byproduct. The fluid coking process differs from the FLEXICOKING™ process that produces the flexicoke in that the fluid coking process does not include a gasifier.

The term "fracture" (or "hydraulic fracture") refers to a crack or surface of breakage within a subterranean formation, that can be induced by an applied pressure or stress.

As used herein, the term "hydraulic conductivity" (or simply "conductivity") refers to the ability of a fluid within a subterranean formation to pass through a fracture including proppant at various stress (or pressure) levels, which is based, at least in part, on the permeability of the proppant deposited within the hydraulic fractures. The hydraulic conductivity values provided herein are based on the American Petroleum Institute's Recommended Practice 19D (API RP-19D) standard, entitled "Measuring the Long-Term Conductivity of Proppants" (First Ed. May 2008, Reaffirmed May 2015).

The term "particle size(s)," when used herein with reference to a type of particles," refers to the diameter(s) of such particle(s). The term "average particle size" means the median particle size of the particles.

The term "petroleum coke" refers to a final carbon-rich solid material that is derived from oil refining. More specifically, petroleum coke is the carbonization product of high-boiling hydrocarbon fractions that are obtained as a result of petroleum processing operations. Petroleum coke is produced within a coking unit via a thermal cracking process in which long-chain hydrocarbons are split into shorter-chain hydrocarbons. As described herein, there are at least three main types of petroleum coke: delayed coke, fluid coke, and flexicoke. Each type of petroleum coke is produced using a different coking process; however, all three coking processes have the common objective of maximizing the yield of distillate products within a refinery by rejecting large quantities of carbon in the residue as petroleum coke.

As used herein, the terms "proppant" and "proppant particle" refer to a solid material capable of maintaining open an induced fracture during and following a hydraulic fracturing treatment. The term "proppant pack" refers to a collection of proppant particles.

The terms "coke proppant" and "coke proppant particles" refer to a proppant based on or derived from a solid carbonaceous material produced from treating a carbon-containing material (e.g., oil (e.g., crude oil, vacuum pipestill, and the like), coal, and hydrocarbons) at an elevated temperature in an oxygen deficient environment. The elevated temperature can be at least 200, 250, 300, 350. 400, 450, 500, 600, 700, 800, 900, or even 1000° C. The carbonaceous material comprises the carbon element and optionally additional elements including but not limited to hydrogen, sulfur, vanadium, iron, and the like. The carbonaceous material preferably comprises the carbon element at a concentration of ≥50 wt %, e.g., from 50, 55, 60, 65, 70, wt %, to 75, 80, 85, 90, 95 wt %, to 96, 97, 98, 99 wt %, or even 100 wt %, based on the total weight of all elements in the carbonaceous material. The carbonaceous material preferably comprises the carbon element and hydrogen element at a combined concentration of ≥55 wt %, e.g., from 55, 60, 65, 70, wt %, to 75, 80, 85, 90, 95 wt %, to 96, 97, 98, 99 wt %, or even 100 wt %, based on the total weight of all elements in the carbonaceous material.

The term "petroleum coke proppant particles" refers to coke proppant particles that are derived from a petroleum coke source material. The terms "petroleum coke fines" and "petroleum coke microproppant particles" refer to petroleum coke proppant particles having particle sizes of at most 105 μm, but potentially within a range from around 0.1 μm to 105 μm (e.g., from around 0.0001, 0.001, 0.01, 0.1 μm to 0.5, 1.0, 2.0, 5.0, 8.0 10 μm, to 15, 20, 25, 30, 35, 40, 45 μm, to 50, 53, 55, 60, 63, 65 μm, to 74, 75, 80, 85, 88, 90, 95, 100, 105 μm).

The term "non-coke proppant" means any proppant that is not a coke proppant. Examples of non-coke proppant include sand, ceramic proppants, glass proppants, and polymer proppants.

The term "lightweight proppant (LWP)" refers to proppants having an apparent density within a range of from around 1.2 g/cm$^3$ to around 2.2 g/cm$^3$ (e.g., from around 1.2, 1.3, 1.4, 1.5, 1.6 g/cm$^3$ to around 1.7, 1.8, 1.9, 2.0, 2.1, 2.2 g/cm$^3$), while the term "ultra-lightweight proppant (ULWP)" refers to proppants having an apparent density within a range from around 0.5 g/cm$^3$ to around 1.2 g/cm$^3$ (e.g., from around 0.5, 0.6, 0.7, 0.8 g/cm$^3$ to around 0.9, 1.0, 1.1, 1.2 g/cm$^3$). A coke proppant may or may not be an LWP. The term "non-LWP proppant" refers to proppants having apparent density higher than 2.2 g/cm$^3$ (e.g., from around 2.3, 2.4, 2.5 to around 2.6, 2.8, 3.0, to 3.2, 3.4, 3.5 g/cm$^3$.) A non-coke proppant may or may not be a non-LWP.

As used herein, the term "pyrolysis coke" refers to a type of coke that is generated via hydrocarbon pyrolysis at temperatures higher than the coking processes for making petroleum coke.

The term "substantially," when used in reference to a quantity or amount of a material, or a specific characteristic thereof, refers to an amount that is sufficient to provide an effect that the material or characteristic was intended to provide. The exact degree of deviation allowable may depend, in some cases, on the specific context.

The term "substantially all," when used herein with reference to a collection of particles, means at least 90 vol %, preferably at least 95 vol %, based on the total volume of the collection of particles.

As used herein, the term "thermally post-treated coke" refers to petroleum coke that has been heated to temperatures in a range from around 400° C. to 1200° C. (e.g., from around 400, 500, 600° C., to 700, 800, 900° C., to 1000, 1100, 1200° C.) for a predetermined duration that is in a range from around 1 minute to around 24 hours (e.g., from around 1 minute, 30 minutes, 1 hour, to 4 hours, 8 hours, 12 hours, to 16 hours, 20 hours, 24 hours).

The term "wellbore" refers to a borehole drilled into a subterranean formation. The borehole may include vertical, deviated, highly deviated, and/or lateral sections. The term "wellbore" also includes the downhole equipment associated with the borehole, such as the casing strings, production tubing, gas lift valves, and other subsurface equipment. Relatedly, the term "hydrocarbon well" (or simply "well") includes the wellbore in addition to the wellhead and other associated surface equipment.

Certain embodiments and features are described herein using a set of numerical upper limits and a set of numerical lower limits. It should be appreciated that ranges from any lower limit to any upper limit are contemplated unless otherwise indicated. All numerical values are "about", "around," or "approximately" the indicated value, and account for experimental errors and variations that would be expected by a person having ordinary skill in the art.

During the drilling of a hydrocarbon well, a wellbore is formed within a subterranean formation using a drill bit that may be advanced at the lower end of a drill string until it reaches a predetermined location in the subsurface. The drill string and bit may then be removed, and the wellbore may be lined with steel tubulars, commonly referred to as casing strings. An annulus may thus be formed between the casing strings and the surrounding subterranean formation. A cementing operation may be conducted to fill the annulus with columns of cement. The combination of the casing strings and the cement strengthens the wellbore and isolates or impedes fluid flow and pressure transmissibility along the annulus.

It is common to place several casing strings having progressively-smaller outer diameters into the wellbore. The first casing string may be referred to as the "surface casing string." The surface casing string serves to isolate and protect the shallower, freshwater-bearing aquifers from contamination by any other wellbore fluids. Accordingly, this casing string may be cemented entirely back to the surface.

A process of drilling and then cementing progressively-smaller casing strings may be repeated several times below the surface casing string until the hydrocarbon well has reached total depth. The final casing string, referred to as the "production casing string," may extend through a hydrocarbon-bearing interval (referred to as a "reservoir") in the subterranean formation. In some instances, the production casing string is a production liner, that is, a casing string that is not tied back to the surface. The production casing string may also be cemented into place. In some completions, the production casing string has swell packers or plugs spaced across selected productive intervals. This creates compartments between the packers for isolation of stages and specific stimulation treatments. In this instance, the annulus may simply be packed with sand.

As part of the completion process, a section of the wellbore (referred to as a "stage") may be isolated through the setting of a packer or plug. The production casing string may then be perforated at one or more desired intervals uphole of the plug, meaning that clusters of perforations are created through the production casing string and the cement column surrounding the production casing string using a perforating gun. In operation, the perforating gun may form one perforation cluster by shooting a number of perforations in close proximity, such as, for example, 12 to 18 perforations at one time, over a 1 foot (ft) (0.3 meter (m)) to 3 ft (3 m) region, for example, with each perforation potentially being approximately 0.3 inches (in) (0.8 centimeters (cm)) to 0.5 in (1.3 cm) in diameter, for example. The perforating gun may then be moved uphole around 10 ft (3 m) to 100 ft (30 m), for example, and a second perforating gun may be used to form a second perforation cluster. This process of forming perforation clusters may be repeated to create additional perforation clusters within each stage of the hydrocarbon well. The resulting perforation clusters may allow hydrocarbon fluids from the surrounding subterranean formation to flow into the hydrocarbon well. Note that in some instances, however, the production casing string is instead provided as a sliding sleeve tubular or other type of casing string with pre-formed perforation clusters. In such instances, the preformed perforations may be initially closed but can be opened through various forms of actuation to control fluid flow through the perforations.

After the perforation process is complete, the subterranean formation may be hydraulically fractured at each stage of the wellbore to increase the productivity of the subterranean formation. Hydraulic fracturing consists of injecting a volume of fracturing fluid through the created perforations and into the surrounding subterranean formation at such high pressures and rates that the subsurface rock in proximity to the perforations cracks open and resulting hydraulic fractures extend outwardly into the subterranean formation in proportion to the injected fluid volume. Ideally, a separate hydraulic fracture emanates outwardly from each perforation cluster, forming a set of hydraulic fractures, commonly referred to as a "fracture network." Ideally, this fracture network includes a sequence of parallel fracture planes, thereby creating as much fracturing of the subsurface rock as possible. Near the wellbore, a complex topology of hydraulic fractures may sometimes result from the breakdown of perforations within each perforation cluster, but it is common to assume that these hydraulic fractures ultimately link up to form a single dominant fracture plane that is hydraulically connected to the wellbore. In operation, to create the hydraulic fracture, the injection pressure of the fracturing fluid must exceed the hydraulic pressure in the subterranean formation plus the strength of the rock, and often even exceeds the lithostatic pressure in the subterranean formation.

Hydraulic fracturing is used most extensively for increasing the productivity of "unconventional" (or "tight") subterranean formations, which are subterranean formations with very low permeability that typically do not produce economically without hydraulic fracturing. Examples of unconventional subterranean formations include tight sandstone formations, tight carbonate formations, shale gas formations, coal bed methane formations, and tight oil formations. During the hydraulic fracturing of such subterranean formations, the pump rate (or injection rate) of the fracturing fluid may be increased until it reaches a maximum pump rate of around 20 barrels per minute (bbl/min) (0.05 cubic meters per second ($m^3/s$)) to around 150 bbl/min (0.41 $m^3/s$) (e.g., 20, 60, 90 bbl/min, to 120, 150 bbl/min). In operation, around 5,000 barrels to around 15,000 barrels (e.g., 5,000, 6,000, 7,000, 8,000 barrels, to 9,000, 10,000, 11,000, 12,000 barrels, to 13,000, 14,000, 15,000 barrels) of fracturing fluid may be injected for each stage of the hydrocarbon well, for example.

In operation, a small portion (e.g., often around 5% to around 10%) of the fracturing fluid may be pumped into the wellbore during a pad phase of the hydraulic fracturing operation for each stage. The pad phase is designed to initiate hydraulic fractures and grow the hydraulic fractures to a certain size and volume to accommodate the injection of a proppant, such as sand, crushed granite, ceramic beads, or other granular materials (which are generally referred to herein as "non-coke proppants"). The remaining portion of the fracturing fluid may then be mixed with the proppant and pumped into the wellbore and through the perforations into the stimulated reservoir volume (SRV). The proppant serves to hold the hydraulic fractures open after the hydraulic pressure is released. Ideally, the resulting hydraulic fractures grow to be hundreds of feet radially from the wellbore into the subterranean formation. In the case of unconventional subterranean formations, the combination of hydraulic fractures and injected proppant substantially increases the flow capacity of the treated formation.

This application of hydraulic fracturing is a routine part of petroleum industry operations as applied to individual subterranean formations. Such subterranean formations may represent hundreds of feet of gross, vertical thickness of subterranean formation. More recently, hydrocarbon wells are being completed through formations laterally, with the lateral sections often extending at least 1,000 ft, in which case the hydrocarbon well may be referred to as an "extended-reach lateral well," or, in some cases, at least 10,000 ft, in which case the hydrocarbon well may be referred to as an "ultra-extended-reach lateral well."

When there are multiple-layered or very thick formations to be hydraulically fractured, or where an extended-reach or ultra-extended-reach lateral well is being completed, then more complex treatment techniques may be utilized to obtain treatment of the entire target area. Therefore, the operating company may isolate the various stages (as described above) to ensure that each separate stage is not only perforated, but also adequately fractured and treated. In this way, the operator may be sure that fracturing fluid is being injected through each perforation cluster and into each stage of interest to effectively increase the flow capacity at each desired depth and lateral location.

Treatment of a stage of interest may involve isolating the stage from all stages that have already been treated. This may involve the use of so-called diversion methods, in which injected fracturing fluid is directed towards one selected stage of interest while being diverted from other stages. In many cases, frac plugs are set between stages and are used to prevent injected fluid from entering stages that have already been fractured and propped.

This hydraulic fracturing process may be repeated for every stage in the hydrocarbon well. In the case of wells including lateral sections, the first stage is typically located near the end (or "toe") of the lateral section, and the last stage is typically located near the beginning (or "heel") of the lateral section. For extended-reach lateral wells, there may be around 20 to around 50 individual stages, for example. For ultra-extended-reach lateral wells, there may be more than 100 stages, for example.

After the hydraulic fracturing process is complete, the frac plugs (and/or other diversion materials) may be drilled out of the hydrocarbon well. The hydrocarbon well may then be brought on production, meaning that it may be used to recover hydrocarbon fluids from the subterranean formation. In operation, the pressure differential between the formation and the hydrocarbon well may be used to force hydrocarbon fluids to flow through the hydraulic fractures within the formation and into the production casing string via the corresponding perforation clusters. The hydrocarbon fluids then flow up the hydrocarbon well to the surface.

In operation, the success of the hydraulic fracturing process has a direct impact on the ultimate production performance of the hydrocarbon well. Specifically, the numbers, sizes, compliances, and locations of the hydraulic fractures corresponding to the perforation clusters within each stage of the hydrocarbon well directly impact the amount of hydrocarbon fluids that are able to mobilize and flow into the hydrocarbon well. However, the success of the hydraulic fracturing process is limited by the ability of the fracturing fluid to penetrate deeply into the formation, thus enabling the proppant to deposit within extended regions of the hydraulic fractures.

According to conventional techniques, sand is often used as the proppant within the fracturing fluid. However, sand tends to settle out of the fracturing fluid relatively quickly, thus limiting the effectiveness of the hydraulic fracturing operation. To mitigate the low transport capacity of sand, highly-viscous carrier fluids are often utilized along with sand to enable the sand to stay suspended within the fracturing fluid for longer periods of time and, therefore, to penetrate deeper into the formation. Slickwater includes added friction reducers, such as high-molecular-weight polyacrylamides, for example, that are designed to reduce the turbulent friction in the wellbore and through the fracture to allow higher injection rates with lower pumping pressures. However, the friction reducers and/or other viscosity-enhancing additives within the slickwater are costly and often cause formation damage, thus reducing the conductivity of the resulting hydraulic fractures. Moreover, even with the utilization of such friction reducers, sand still tends to settle out of the fracturing fluid relatively quickly.

With this in mind, lower-density proppants are desirable in certain circumstances. However, although low-density proppants (e.g., LWP and ULWP) have been developed, such proppants may not exhibit the necessary mechanical, thermal, and/or chemical stability to be effective proppants within hydrocarbon wells. Specifically, currently-available low-density proppants do not exhibit sufficient compressive strengths and hydraulic conductivities to successfully compete with conventional, sand-based proppants and/or are not cost-competitive with conventional, sand-based proppants.

As a result, we have developed proppants formed from petroleum coke (referred to herein as "petroleum coke proppant particles"). Petroleum coke proppant particles include a number of properties and features that alleviate difficulties that are typically encountered during the hydraulic fracturing of subterranean formations via hydrocarbon wells. First, the lower-density nature of petroleum coke enables petroleum coke proppant particles to transport further within the wellbore and the corresponding hydraulic fractures as compared to non-coke proppant particles (e.g., sand). In addition, we have found that petroleum coke proppant particles are less prone than non-coke proppant particles to flow back into the wellbore once the hydraulic fracturing operation is complete and the hydrocarbon well is brought on production. Moreover, we have found that petroleum coke proppant particles are less prone than non-coke proppant particles to settle around any diversion materials within the wellbore, thus enabling dissolvable, biodegradable, or self-destructible diversion materials (such as dissolvable plugs, for example) to be effectively used within the wellbore. Furthermore, the utilization of petroleum coke proppant particles reduces the likelihood of cluster-level screen-out as compared to the utilization of non-coke proppant particles. Each of these factors (among others) may advantageously reduce or eliminate the need to perform a wellbore cleanout procedure.

Moreover, the lower-density nature of petroleum coke particles enables petroleum coke proppant particles to transport further within each stage and further throughout the perforation clusters as compared to non-coke proppant particles. As a result, we have found that fracturing fluids including petroleum coke proppant particles more evenly and efficiently flow throughout the stages and into the perforation clusters and, therefore, also more efficiently travel into the tips (or at least within proximity to the tips) of the formed hydraulic fractures.

As described herein, petroleum coke has sufficient crush strength to maintain propped fractures upon the removal of hydraulic pressure and to maintain efficient conductivity once the wellbore is brought on production. In addition, the relatively low density of petroleum coke may decrease or eliminate the need to use gelled fracturing fluids, thereby avoiding the costs associated with gelation. Furthermore, using petroleum coke may potentially reduce required injection pressures, reduce overall water consumption, and avoid the need for frequent wellbore cleanouts.

Effective proppant particles are typically associated with a variety of particular characteristics or properties, including efficient proppant particle transport within a carrier fluid, sufficient strength to maintain propped fractures upon the removal of hydraulic pressure, and efficient conductivity once the wellbore is brought on production. With respect to the proppant particle transport properties, the settling rate of a proppant particle within a fracturing fluid at least in part determines its transport capacity within a hydraulic fracture. The settling rate of a proppant particle can be determined using Equation (1).

$$v = \frac{\rho_p - \rho_f}{18\eta} g\sigma^2, \tag{1}$$

In Equation (1), v is the settling rate of the proppant particle, $\rho_p - \rho_f$ is proportional to the density difference between the proppant particle and the carrier fluid, $\eta$ is the viscosity of the carrier fluid, g is the gravitational constant, and $\sigma^2$ is proportional to the square of the proppant particle size. As will be appreciated, proppant particles having lower apparent densities and/or smaller average particle sizes settle at a slower rate within an identical carrier fluid (thus having better transport) compared to higher apparent density and/or larger average particle sized proppant particles. We have found that coke particles, particularly petroleum coke particles, are therefore particularly well-suited for utilization as a proppant during hydraulic fracturing operations due at least in part to the relatively low apparent densities of petroleum coke particles as compared to non-coke proppants (e.g., sand).

With regard to particle size, fluid coke particles and flexicoke particles are generated in a wide range of sizes. This is illustrated by FIG. 1, which is a graph 100 showing particle sizes for four unsieved fluid coke samples. The particle sizes were measured using laser particle size analysis (LPSA), which is a rapid and precise optical sieve technique for particle size analysis that works on the principle of measuring the intensity of light scattered as a laser beam passes through a dispersed particulate sample. In this case, particles with sizes exceeding 3,000 microns (μm) were removed prior to the analysis. As shown in FIG. 1, all four unsieved fluid coke samples exhibited a wide range of particle sizes upon exiting the reactor.

Figure 2:
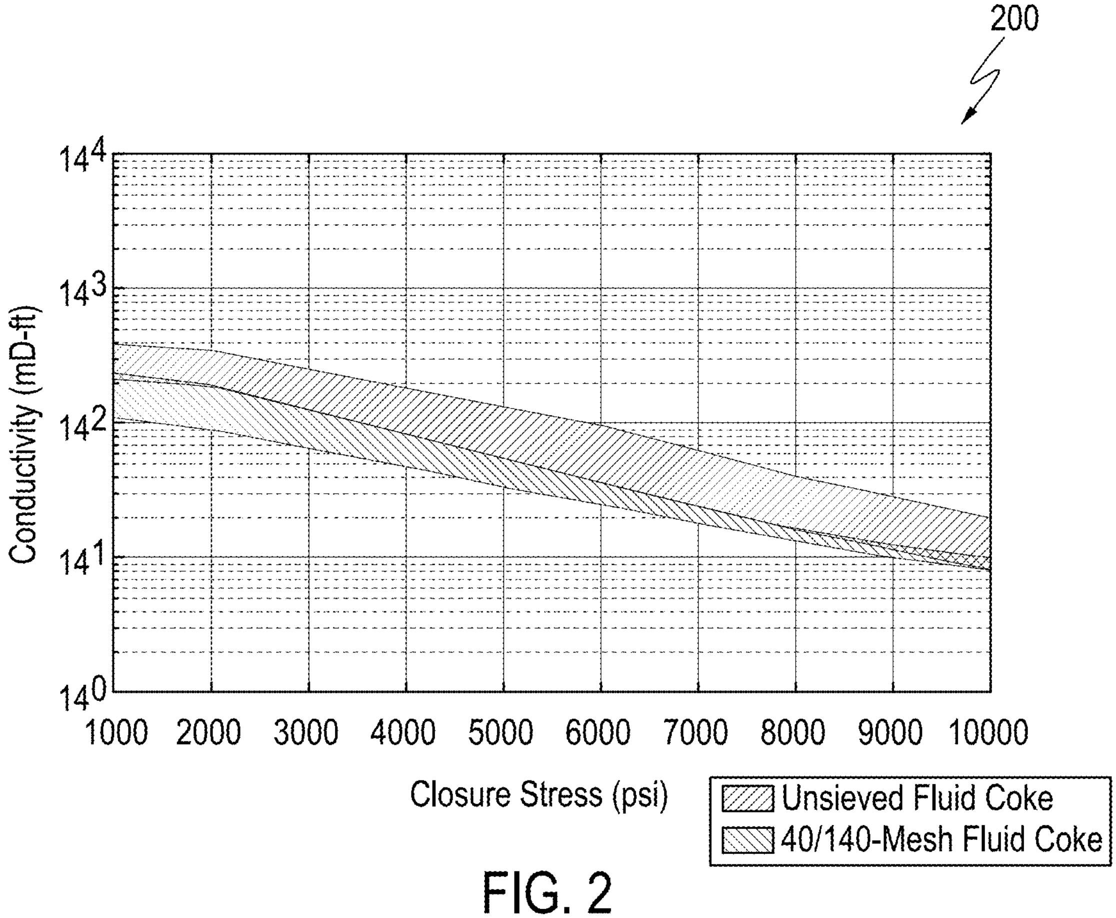
FIG. 2 is a graph showing conductivity as a function of closure stress for an unsieved fluid coke sample and a sieved, 40/140-mesh fluid coke sample.

Based on Stokes law and Equation (1), particles with smaller particle sizes are expected to have a lower settling velocity than particles with larger particle sizes. In the case of petroleum coke particles, this was confirmed via conductivity testing, as illustrated by FIG. 2. Specifically, FIG. 2 is a graph 200 showing conductivity (in millidarcy-feet (mD-ft)) as a function of closure stress (in pounds per square inch (psi)) for an unsieved fluid coke sample and a sieved 40/140-mesh fluid coke sample, where the conductivity testing was performed at 2 pounds per square foot ($lb/ft^2$) loading for 2 hours. As shown, the graph 200 confirms that sieving petroleum coke particles to obtain sieved petroleum coke proppant particles with a particular size range (e.g., 40-mesh to 140-mesh in this example) results in improved performance of the proppant particles in terms of conductivity.

Figure 3:
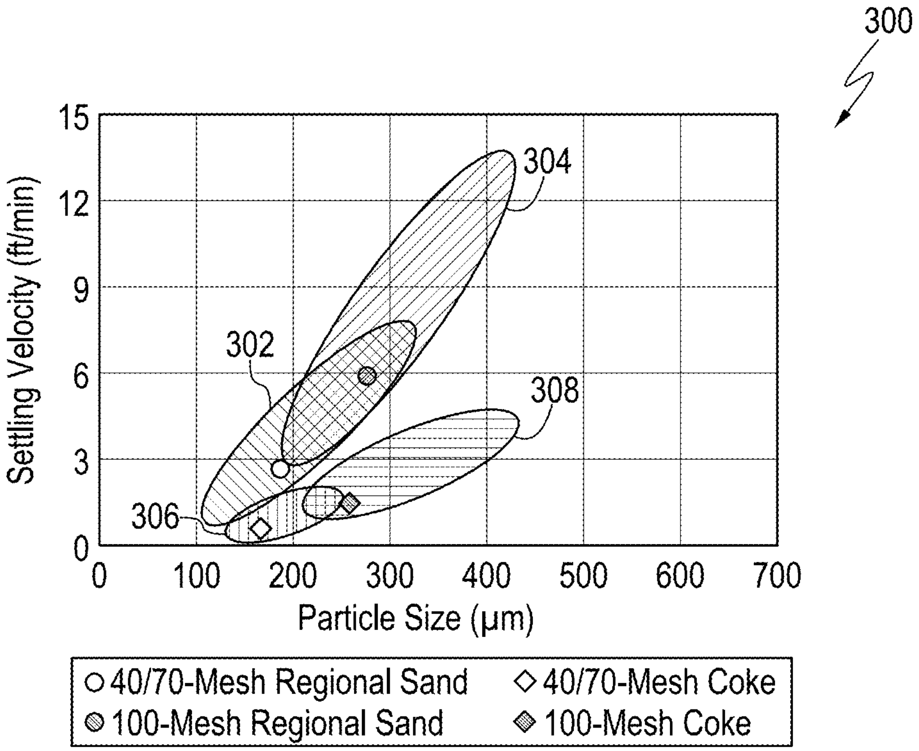
FIG. 3 is a graph showing settling velocity as a function of particle size for several different mesh sizes of sand and petroleum coke.

FIG. 3 is a graph 300 showing settling velocity as a function of particle size for several different mesh sizes of sand and petroleum coke. Specifically, the graph 300 shows settling velocity (in feet per minute (ft/min)) as a function of particle size (in μm) for 40/70-mesh regional sand (as represented by a first region 302), 100-mesh regional sand (as represented by a second region 304), 40/70-mesh petroleum coke (as represented by a third region 306), and 100-mesh petroleum coke (as represented by a fourth region 308), where the settling velocity value is based on a modified Stokes settling velocity. As illustrated by the graph 300, petroleum coke has a significantly lower settling rate (or velocity) than sand for comparable particle sizes. As a result, proppant particles formed from petroleum coke will perform better than proppant particles formed from sand in terms of transport capacity within the fractures created during a hydraulic fracturing operation.

Based on the aforementioned discussion, it is clear that petroleum coke proppant particles should be appropriately sized to provide for the effective utilization of the petroleum coke proppant particles during hydraulic fracturing operations. If the particles are too large, such particles may become heavy and lose their advantageously low settling velocity. In addition, particles that are too large may create operational issues in pumping across rotating equipment and attempting to flow the particles through narrow perforations and perforation tunnels. On the other hand, if the particles are too small, such particles may be useful as petroleum coke microproppant particles in particular scenarios but may be unsuitable for other scenarios, such as when there is a concern regarding fine particles degrading the conductivity of the main proppant pack. As a result, because petroleum coke proppant particles are produced from a variety of refinery types and are distributed in a wide range of sizes, the present disclosure alleviates the foregoing difficulty and provides related advantages as well by providing methods for preparing petroleum coke proppant particles for hydraulic fracturing. More specifically, according to the present disclosure, methods are provided for converting petroleum coke particles to petroleum coke proppant particles that are appropriately-sized for effective utilization as proppant during hydraulic fracturing operations.

In various embodiments, the petroleum coke particles may be received from one or more refineries. In various embodiments, it may be ensured that the petroleum coke fines that were separately captured at the refineries are not mixed into the main petroleum coke product prior to receiving such product from the refineries. Moreover, in various embodiments, it may be ensured that the petroleum coke particles are not sprayed with any type of liquid for dust control purposes. Such dust control is currently common practice for petroleum coke products. However, wet particles are very difficult to sieve to produce proppant particles of suitable sizes. Therefore, such dust control is generally not preferable for hydraulic fracturing purposes.

The received petroleum coke particles may then be appropriately sized for hydraulic fracturing purposes. In various embodiments, this includes sieving the petroleum coke particles for a first pass of size classification (or size-classifying). In some embodiments, this is followed by grinding and re-sieving of the remaining petroleum coke particles to maximize the yield of particles with the desired size range. However, in other embodiments, the grinding may be performed prior to the sieving, or the grinding may be performed both before and after the sieving, depending on the details of the particular implementation. Furthermore, in various embodiments, an elutriation system or any other suitable type of size classifier is then used to carefully remove any remaining particles that are not appropriately-sized (e.g., any remaining petroleum coke fines), resulting in the output of petroleum coke proppant particles with a desired range of particle sizes for hydraulic fracturing purposes. In some embodiments, such desired range of particle sizes is from around 88 μm (170-mesh) to 297 μm (50-mesh) or from around 105 μm (140-mesh) to 210 μm (70-mesh), for example, although the desired range of particle sizes may vary depending on the details of the particular implementation. For example, the desired range of particle sizes may be from around 88, 105, 125, 149 μm to around 177, 210, 250, 297, 354 μm.

Any suitable type(s) of petroleum coke product(s) may be obtained from one or more refineries according to aspects and embodiments described herein. For example, the petroleum coke product(s) may include but are not limited to fluid coke particles, flexicoke particles, delayed coke particles, thermally post-treated coke particles, and/or pyrolysis coke particles.

For embodiments in which the petroleum coke product(s) from the one or more refineries include flexicoke particles, such flexicoke particles are produced via the FLEXICOKING™ process. Briefly, the FLEXICOKING™ process integrates a cracking reactor, a heater, and a gasifier into a common fluidized-solids (coke) circulating system. A feed stream (of residua) is fed into a fluidized bed, along with a stream of hot recirculating material to the reactor. From the reactor, a stream containing coke is circulated to the heater vessel, where it is heated. The hot coke stream is sent from the heater to the gasifier, where it reacts with air and steam. The gasifier product gas, referred to as coke gas, containing entrained coke particles, is returned to the heater and cooled by cold coke from the reactor to provide a portion of the reactor heat requirement. A return stream of coke sent from the gasifier to the heater provides the remainder of the heat requirement. The coke meeting the heat requirement is then circulated to the reactor, and the feed stream is thermally cracked to produce light hydrocarbon liquids that are removed from the reactor and recovered using conventional fractionating equipment. Fluid coke is formed from the thermal cracking process and settles (deposits) onto the "seed" fluidized bed coke already present in the reactor. The resultant at least partially gasified coke is flexicoke. In some instances, the coke from the thermal cracking process deposits in a pattern that appears ring-like atop the surface of the seed coke. Flexicoke is continuously withdrawn from the system during normal FLEXICOKING™ processing (e.g., from the reactor or after it is streamed to the heater via an elutriator) to ensure that the system maintains particles of coke in a fluidizable particle size range. Accordingly, flexicoke is a readily available byproduct of the FLEXICOKING™ process.

The gasification process of FLEXICOKING™ results in substantial concentration of metals in the flexicoke product and additionally allows for operational desulfurization of sulfur from the flexicoke. The gasification can be minimized or maximized to influence the sulfur content (minimization=lower sulfur content). Accordingly, unlike cokes formed in other processes, flexicoke has a comparatively high metal content and a comparatively lower sulfur content that can be manipulated.

In various embodiments, the flexicoke particles may have a carbon content that is in a range from around 85 weight percent (wt %) to around 99 wt % (e.g., from around 85, 87, 89, 91 wt %, to 93, 95, 97, 99 wt %); a weight ratio of carbon to hydrogen that is in a range from around 80:1 to around 95:1 (e.g. from around 80:1, 85:1, to 90:1, 95:1); and an impurities content (i.e., a weight percent of all components other than carbon and hydrogen) that is in a range from around 1 wt % to around 10 wt % (e.g., around found 1, 2, 3, 4, 5 wt %, to 6, 7, 8, 9, 10 wt %). Flexicoke also has a higher metal content than other cokes. In particular, the flexicoke particles may have a combined vanadium and nickel content that is in a range from around 3,000 parts per million (ppm) to around 45,000 ppm (e.g., from around 3,000, 10,000, 15,000 ppm, to 20,000, 25,000, 30,000 ppm, to 35,000, 40,000, 45,000 pm). In addition, the flexicoke particles may have a sulfur content that is in a range from 0 wt % to around 5 wt % (e.g. from 0, 1, 2 wt %, to 3, 4, 5 wt %), as well as a nitrogen content that is in a range from 0 wt % to around 3 wt % (e.g., from 0, 0.5, 1.0, 1.5 wt %, to 2.0 2.5, 3.0 wt %).

The apparent density of the flexicoke particles may be in a range from around 1.0 g/cm$^3$ to around 2.0 g/cm$^3$ (e.g., from around 1.0, 1.1, 1.2, 1.3 g/cm$^3$, to 1.4, 1.5, 1.6, 1.7 g/cm$^3$, to 1.8, 1.9, 2.0 g/cm$^3$). Conventional sand-based proppants generally have apparent densities of at least around 2.5 g/cm$^3$. Thus, the flexicoke particles have substantially lower apparent densities compared to conventional, sand-based proppants, which is indicative of their comparably more effective transport and lower settling rates within a fracture formed as part of a hydraulic fracturing operation.

For embodiments in which the petroleum coke product(s) from the one or more refineries include fluid coke particles, such fluid coke particles are obtained via a fluid coking process. The fluid coking process may be manipulated in various ways to produce fluid coke particles having a number of distinctive characteristics. For example, the fluid coke particles may have a carbon content that is in a range from around 75 wt % to around 93 wt % (e.g., from around 75, 77, 79, 81, 83 wt %, to 85, 87, 91, 93 wt %); a weight ratio of carbon to hydrogen that is in a range from around 30:1 to around 50:1 (e.g., around 30:1, 35:1, to 40:1, 45:1, 50:1); and an impurities content that is in a range from around 5 wt % to around 25 wt % (e.g., from around 5, 10, 15 wt %, to 20, 25 wt %). The fluid coke particles may also have a sulfur content that is in a range from around 3 wt % to around 10 wt % (e.g., from around 3, 4, 5, 6 wt %, to 7, 8, 9, 10 wt %), as well as a nitrogen content that is in a range from around 0.5 wt % to around 3 wt % (0.5, 1.0, 1.5 wt %, to 2.0, 2.5, 3.0 wt %). In addition, the apparent density of the fluid coke particles may be in a range from around 1.4 g/cm$^3$ to around 2.0 g/cm$^3$ (e.g., from around 1.4, 1.5, 1.6 g/cm$^3$, to 1.7, 1.8, 1.9, 2.0 g/cm$^3$).

For embodiments in which the petroleum coke product(s) from the one or more refineries include delayed coke particles, such delayed coke particles are produced within a delayed coking unit via a delayed coking process. According to the delayed coking process, a preheated feedstock is introduced into a fractionator, where it undergoes a thermal cracking process in which long-chain hydrocarbons are split into shorter-chain hydrocarbons. The resulting lighter fractions are then removed as sidestream products. The fractionator bottoms, which include a recycle stream of heavy product, are heated in a furnace, which typically has an outlet temperature that is in a range from around 480° C. to around 515° C. The heated feedstock then enters a reactor, referred to as a "coke drum," which typically operates at temperatures that are in a range from around 415° C. to around 450° C. Within the coke drum, the cracking reactions continue. The resulting cracked products then exit the coke drum as an overhead stream, while coke deposits on the inner surface of the coke drum. In general, this process is continued for a period of around 16 hours to around 24 hours to allow the coke drum to fill with coke. In addition, to allow the delayed coking unit to operate on a batch-continuous (or semi-continuous) basis, two or more coke drums are typically used. While one coke drum is on-line filling with coke, the other coke drum is being steam-stripped, cooled, decoked (e.g., via hydraulically cutting the deposited coke with water), pressure-checked, and warmed up. Moreover, the overhead stream exiting the coke drum enters the fractionator, where naphtha and heating oil fractions are recovered. The heavy recycle material is then typically combined with preheated fresh feedstock and recycled back into the process.

The delayed coke particles may exhibit the following properties: (1) a carbon content that is in a range from around 82 wt % to around 90 wt % (e.g., from around 82, 83, 84, 85 wt %, to 86, 87, 88, 89, 90 wt %); (2) a weight ratio of carbon to hydrogen that is in a range from around 15:1 to around 30:1 (e.g., from around 15:1, 20:1, to 25:1, 30:1); (3) a combined vanadium and nickel content that is in a range from around 100 ppm to around 3,000 ppm (e.g., from around 100, 500, 1,000, 1,500 ppm, to 2,000, 2,500, 3,000 ppm); (4) a sulfur content that is in a range from around 2 wt % to around 8 wt % (e.g., from around 2, 3, 4, 5 wt %, to 6, 7, 8 wt %); and/or (5) a nitrogen content that is in a range from around 1 wt % to around 2 wt % (e.g., from around 1.0, 1.2, 1.4 wt %, to 1.6, 1.8, 2.0 wt %), where such properties are measured on a dry, ash-free basis (or, in other words, not counting residual ash content and removing moisture before the analysis). In addition, the delayed coke particles may have a moisture content that is in a range from around 6 wt % to around 14 wt % (e.g., from around 6, 8, 10 wt %, to 12, 14 wt %) and a volatile matter content that is in a range from around 6 wt % to around 18 wt % (e.g., from around 6, 8, 10, 12 wt %, to 14, 16, 18 wt %), as measured on an as-received basis. Moreover, the apparent density of the delayed coke particles may be in a range from around 1.0 g/cm$^3$ to around 1.7 g/cm$^3$ (e.g., from around 1.0, 1.1, 1.2, 1.3 g/cm$^3$, to 1.4, 1.5, 1.6, 1.7 g/cm$^3$). Furthermore, the crush strength of the delayed coke particles may be comparable to the crush strengths of other types of petroleum coke particles.

For embodiments in which the petroleum coke product(s) from the one or more refineries include petroleum coke microproppant particles, such petroleum coke microproppant particles may include wet flexicoke fines and/or dry flexicoke fines produced as a byproduct of the FLEXICOKING™ process. Such wet flexicoke fines and/or dry flexicoke fines are collected as particles that were not recovered in the secondary cyclones of the heater within the flexicoker. More specifically, the particles are collected first in the tertiary cyclone as dry flexicoke fines, and the smaller particles that travel past the tertiary cyclone are then recovered in the venturi scrubber as wet flexicoke fines.

In various embodiments, petroleum coke microproppant particles according to embodiments described herein have a particle size of at most 105 μm (140 mesh) or, in some cases, a particle size of at most 88 μm (170 mesh), but potentially within a range from around 0.0001 μm to 105 μm (e.g., from around 0.0001, 0.001, 0.01, 0.1 μm to 0.5, 1.0, 2.0, 5.0, 8.0 10 μm, to 15, 20, 25, 30, 35, 40, 45 μm, to 50, 53, 55, 60, 63, 65 μm, to 74, 75, 80, 85, 88, 90, 95, 100, 105 μm). Moreover, in various embodiments, such petroleum coke microproppant particles have an apparent density that is in a range from around 1.0 g/cm$^3$ to around 2.0 g/cm$^3$ (e.g., from around 1.0, 1.1, 1.2, 1.3 g/cm$^3$, to 1.4, 1.5, 1.6, 1.7 g/cm$^3$, to 1.8, 1.9, 2.0 g/cm$^3$), although the exact apparent density of the particles may vary depending on the specific type(s) of coke utilized. By comparison, sand generally has an apparent density of at least around 2.5 g/cm$^3$. Therefore, because the settling rate is proportional to the difference in density between the solid particles and the carrier fluid (as shown in expressions for both Stokes terminal settling velocity and Ferguson & Church settling velocity), such petroleum coke microproppant particles have a significantly lower settling rate than sand. As a result, such petroleum coke microproppant particles will perform better than sand and other non-coke proppant particles in terms of transport capacity within hydraulic fractures that are created, reopened, and/or extended during a hydraulic fracturing operation.

Figure 4:
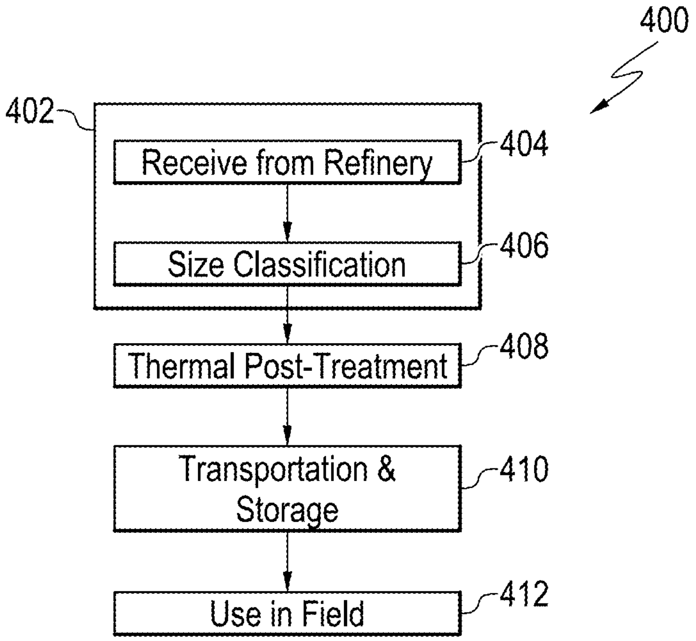
FIG. 4 is a process flow diagram of an exemplary process for preparing petroleum coke proppant particles and utilizing such particles during hydraulic fracturing.

FIG. 4 is a process flow diagram of an exemplary process 400 for preparing petroleum coke proppant particles and utilizing such particles during hydraulic fracturing. Of particular relevance to aspects and embodiments described herein, FIG. 4 highlights a sub-process 402 for preparing the petroleum coke proppant particles. The sub-process 402 includes receiving petroleum coke particles from one or more refineries at block 404, as well as performing size classification for the petroleum coke particles at block 406.

As described herein, the petroleum coke particles received from the refineries at block 404 may include any suitable type(s) of petroleum coke. For example, the petroleum coke particles may include fluid coke, flexicoke, delayed coke, thermally post-treated coke, pyrolysis coke, or any combination thereof.

Moreover, with respect to block 404, certain actions may be taken at the refineries to improve the suitability of the petroleum coke particles to be utilized as proppant. Specifically, the petroleum coke particles may be prevented from becoming wet. It is currently common practice to spray water with surfactant or diesel on petroleum coke particles at refineries for dust control purposes. However, it is very difficult to sieve wet particles; therefore, in various embodiments, this dust control process may be prevented. In addition, the dry particles may be less oil-wet and able to more easily mix into the fracturing fluid at the production site, providing improved operational efficiency. Notably, in some embodiments, it may be desirable to increase the oil-wettability of the particles to reduce the water-oil ratio of the resulting produced hydrocarbon fluids; in this case, it may be preferable to spray or coat the particles with diesel. However, in general, operational efficiency is preferred, and the dust control process is not performed according to aspects and embodiments described herein.

Another action that may be taken at the refineries to improve the suitability of the petroleum coke particles to be utilized as proppant is separation of the collected dust. Specifically, according to current practice, the petroleum coke dust that is collected from baghouses is often dumped into the main petroleum coke product. However, once such dust is mixed in with the main petroleum coke product, it can be very difficult and costly to separate the dust particles from the larger petroleum coke particles. Therefore, according to aspects and embodiments described herein, such dust may not be added to the main petroleum coke product. In this manner, greater efficiency can be achieved by avoiding the difficult and costly dust separation process.

The resulting petroleum coke from the refineries may then be converted to petroleum coke proppant particles via size classification at block 406. In general, such size classification may include separating the petroleum coke into multiple particle collections having differing size ranges, such as, for example, a first collection of petroleum coke particles with a desired range of particle sizes suitable for utilization as petroleum coke proppant particles, a second collection of smaller petroleum coke particles that are suitable for utilization as petroleum coke microproppant particles, and a third collection of larger petroleum coke particles that are not suitable for hydraulic fracturing purposes.

More specifically, in various embodiments, size classification may include sieving the petroleum coke to separate such petroleum coke into smaller petroleum coke particles with a desired maximum particle size and larger petroleum coke particles that exceed such desired maximum particle size. The desired maximum particle size may be 297 μm (50-mesh), 210 μm (70-mesh), or any other suitable maximum particle size for the intended hydraulic fracturing operation. In various embodiments, the sieved smaller petroleum coke particles may include both the first collection of petroleum coke particles with the desired range of particle sizes suitable for utilization as petroleum coke proppant particles and the second collection of smaller petroleum coke particles that are suitable for utilization as petroleum coke microproppant particles, while the sieved larger petroleum coke particles may include the third collection of larger petroleum coke particles that are not suitable for hydraulic fracturing purposes. In some embodiments, the sieved smaller petroleum coke particles may be further sieved to remove petroleum coke particles that do not meet a desired minimum particle size. Such desired minimum particles size may be 74 μm (200-mesh), 88 μm (170-mesh), 105 μm (140-mesh), or any other suitable minimum particle size for the intended hydraulic fracturing operation. In such embodiments, the resulting sieved petroleum coke particles may include a large proportion of particles with the desired range of particle sizes (e.g., 50/170-mesh or 70/140-mesh), although some amount of fines (e.g., petroleum coke microproppant particles) may still be present.

In various embodiments, any suitable type(s) of filters, screens, and/or associated machinery may be utilized for the sieving process, depending on the details of the particular implementation. In some embodiments, the sieving equipment may be specifically designed or configured to provide particles with the desired range of particle sizes.

Next, the sieved petroleum coke particles may be further separated into the first collection of petroleum coke particles with the desired range of particle sizes suitable for utilization as petroleum coke proppant particles (e.g., particles within the 50/170-mesh or 70/140-mesh size range) and the second collection of smaller petroleum coke particles that are suitable for utilization as petroleum coke microproppant particles (e.g., particles with sizes of 88 μm (170-mesh) or less, or 105 μm (140-mesh) or less). In various embodiments, this is achieved via air classification. In such embodiments, an air elutriator and/or any other suitable type(s) of air classifiers may be utilized for this purpose. Moreover, in some embodiments, a water elutriator, hydrocyclone, fluidized bed dryer, and/or other type of size classifier may be additionally or alternatively used.

In various embodiments, the combination of first sieving the petroleum coke particles and then performing air classification (e.g., air elutriation) on such petroleum coke particles advantageously maximizes the resulting number of petroleum coke particles with the desired range of particle sizes suitable for utilization as petroleum coke proppant particles.

In some embodiments, the desired range of particle sizes for the petroleum coke proppant particles is from around 105 μm (140-mesh) to around 210 μm (70-mesh) (in which case the petroleum coke microproppant particles may have particle sizes of at most 105 μm (140-mesh). In other embodiments, the desired range of average particle sizes for the petroleum coke proppant particles is from around 88 μm (170-mesh) to around 297 μm (50-mesh) (in which case the petroleum coke microproppant particles may have particle sizes of at most 88 μm (170-mesh). However, these are merely provided as exemplary desired ranges of particle sizes for the petroleum coke proppant particles, since such range may be tailored to the details of the particular implementation.

In some embodiments, at least a portion of the petroleum coke may be ground prior to the initial sieving process. This may increase the yield of petroleum coke particles with the desired range of particle sizes by breaking the larger particles into the desired size range prior to the sieving process. Any suitable type(s) of grinding/milling technique(s) may be used for this purpose. For example, in some embodiments, the petroleum coke particles may be processed using hammer milling techniques, jet milling techniques, ball milling techniques, or the like, where each of these techniques generally involves crushing or pulverizing the particles to a suitable size and shape for utilization as petroleum coke proppant particles. Moreover, those skilled in the art will appreciate that any number of other grinding, milling, or other processing techniques may be additionally or alternatively used, depending on the details of the particular implementation.

The resulting petroleum coke proppant particles may optionally be thermally post-treated at block 408. In various embodiments, this may include heating the petroleum coke proppant particles to temperatures in a range from around 400° C. to around 1200° C. (e.g., from around 400, 500, 600, 700, 800° C., to around 900, 1000, 1100, 1200° C.) for a predetermined duration that is in a range from around 1 minute to around 24 hours (e.g., from around 1 minute, 30 minutes, 1 hour, 4 hours, 8 hours to around 12 hours, 16 hours, 20 hours, 24 hours). Moreover, in some embodiments, the petroleum coke proppant particles may be post-treated in any other suitable manner, such as, for example, via coating with wax and/or resin. In some such embodiments, the coating of the particles may be performed subsequent to the thermal post-treatment of such particles.

At block 410, the petroleum coke proppant particles may be transported to the production site and stored in any suitable manner. In some embodiments, the petroleum coke proppant particles may be transported via truck or rail. When the hydraulic fracturing operation commences, the petroleum coke proppant particles may then be mixed with a carrier fluid, additives (if any), and non-coke proppant particles (if any) to form a fracturing fluid. This mixing may be performed using a hopper or any other suitable mixing equipment.

Finally, at block 412, the petroleum coke proppant particles may be used in the field during the hydraulic fracturing operation via introduction of the fracturing fluid including the petroleum coke proppant particles into a subterranean formation. More specifically, in various embodiments, this may include pumping the fracturing fluid including the petroleum coke proppant particles into the subterranean formation at a high pump rate (e.g., an average pump rate of at least 25 bbl/min (0.07 $m^3$/s) and at most 250 bbl/min (0.68 $m^3$/s)) to form hydraulic fractures within the subterranean formation. In various embodiments, this process is conducted one stage at a time along a wellbore, where each stage is hydraulically isolated from any other stages that have been previously fractured. Moreover, in various embodiments, the stage being fractured has clusters of perforations that allow the flow of the fracturing fluid through a metal tubular casing of the wellbore into the subterranean formation.

Turning to additional details regarding the size classification process according to aspects and embodiments described herein, we have found that the combination of sieving and then air classifying (e.g., elutriating) the petroleum coke effectively produces petroleum coke proppant particles with the desired particle sizes. In fact, we have found that such combination of sieving and air classification is effective even if the petroleum coke has been previously ground (thus generating a larger number of particles and fines compared to the initial petroleum coke). Notably, in some embodiments, such grinding of the petroleum coke may be performed to break the larger particles into smaller particles that include the desired range of particle sizes.

We have found that air classification without sieving is not highly effective at providing petroleum coke particles with the desired range of particle sizes. This is illustrated by Table 1, which shows that the air classification of milled petroleum coke samples originally containing around 50% fines (where such fines included particle sizes of at most 105 μm (140 mesh)) successfully drove the fines content down to less than 20% (with results varying depending on the type of analysis technique that was utilized). As a specific example, looking at the test labeled "3 Coarse" in Table 1, over 50% of the sample was removed, and yet the remaining sample still did not meet the threshold requirement of less than 5% fines content. As a result, we concluded that it would be difficult to obtain a desired fines content of less than around 5% using air classification without sieving, and it is preferred to first perform sieving and then perform air classification, as described herein.

TABLE 1

| Sample | | Percent Less than 140 Mesh | | | |
|---|---|---|---|---|---|
| Sample | Description | Aire Sieve | Rotap | Microtrac | Wet LPSA |
| Milled Feed A (Sample 1) | Ground Samples - No Elutriation | 51.0 | 50.0 | 50.2 | No Sample Obtained |
| Milled Feed A (Sample 2) | | 50.5 | 49.5 | 48.9 | |
| Milled Feed A (Sample 3) | | 50.0 | 49.0 | 47.8 | |
| Milled Feed B (Sample 1) | | 65.0 | 64.0 | 48.9 | |
| Milled Feed B (Sample 2) | | 46.0 | 46.5 | 48.8 | |
| Milled Feed B (Sample 3) | | 56.0 | 54.0 | 53.2 | |
| 3 Coarse | Elutriation on Ground Samples at One Speed (25% Yield) | 0.0 | 2.0 | 2.3 | 15.9 |
| 5 Coarse | Elutriation on Ground Sample at Lower Speed (Higher Yield) | 5.5 | 16.5 | 17.8 | 17.3 |
| 8 Coarse | Elutriation on Spec 1 Coke Sample | 5.5 | 8.5 | 5.4 | 9.1 |
| 12 Coarse | Elutriation on 50/50 Mix of Spec 1 Coke Sample + Ground Coke | 4.5 | 12.5 | 15.7 | 11.4 |

As described above, we have found that sieving followed by air classification (e.g., elutriation) is highly effective at providing petroleum coke particles with the desired range of particle sizes. This is further illustrated by Table 2, which show the results of a test in which a petroleum coke sample was first ground, then sieved, and then air classified. The fines content of the sample was successfully reduced from around 18% to less than 1%. The yield (meaning the volume percent of the obtained product with the desired range of particle sizes, based on the total volume of the original petroleum coke sample) was around 72%. As a result, we have found that sieving the sample enables a large percentage of the fines to be removed. This then allows the air classifier (e.g., elutriator) to remove a large amount of the remaining fines without drastic yield reduction.

TABEL 2

| | Cumulative Volume Fraction (%) | |
|---|---|---|
| Particle Size (μm) | Ground and Sieved Only | Groung, Sieved and Elutriated |
| 0.5 | 0 | 0 |
| 9 | 0 | 0 |
| 11 | 0 | 0 |
| 13 | 0 | 0 |
| 15 | 0 | 0 |
| 18 | 0 | 0 |
| 22 | 0 | 0 |
| 26 | 0 | 0 |
| 31 | 0 | 0 |
| 37 | 0 | 0 |
| 43 | 0.19 | 0 |
| 50 | 0.88 | 0 |
| 60 | 2.74 | 0 |
| 75 | 6.45 | 0.09 |
| 90 | 11.48 | 0.23 |
| 105 | 18.32 | 0.84 |
| 125 | 29.34 | 4.59 |
| 150 | 44.48 | 17.03 |
| 180 | 61.53 | 36.09 |
| 210 | 74.90 | 52.58 |
| 250 | 86.39 | 68.28 |
| 300 | 93.81 | 81.34 |
| 360 | 97.75 | 91.55 |
| 430 | 99.44 | 97.53 |
| 510 | 100 | 100 |
| 610 | 100 | 100 |
| 730 | 100 | 100 |
| 870 | 100 | 100 |
| 1030 | 100 | 100 |
| 1230 | 100 | 100 |
| 1470 | 100 | 100 |
| 1750 | 100 | 100 |

Figure 5A:
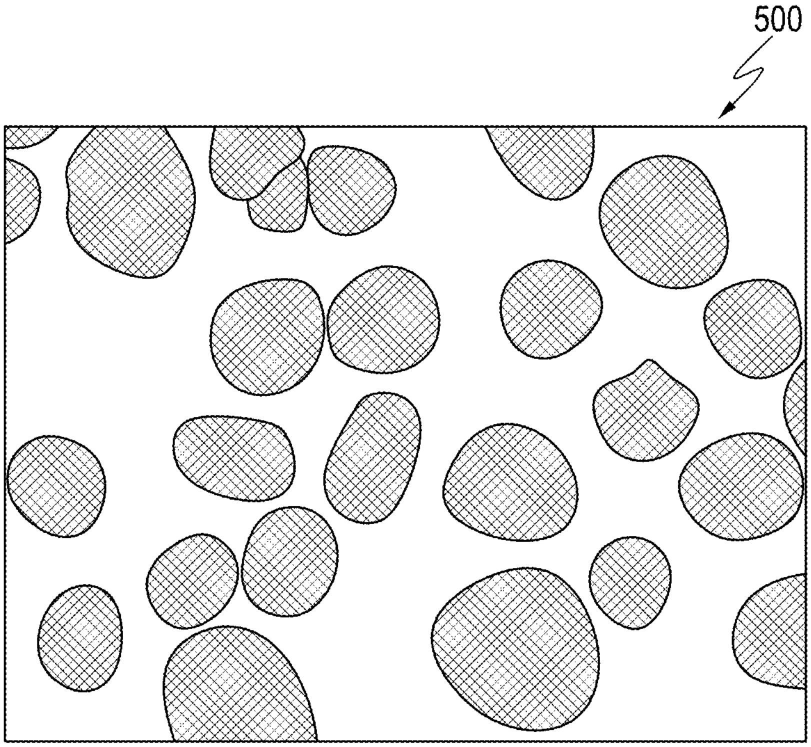
FIG. 5A illustrates a petroleum coke sample.
Figure 5B:
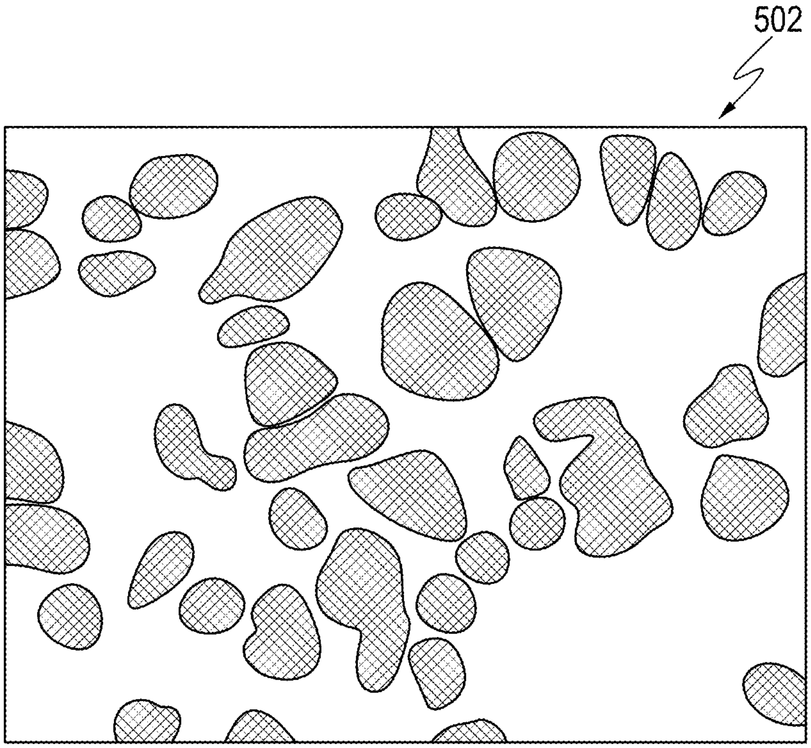
FIG. 5B illustrates the petroleum coke sample of FIG. 5A after grinding and sieving.

Turning now to a discussion of the manner in which the size classification process can impact the conductivity of the resulting petroleum coke proppant particles, FIGS. 5A and 5B illustrate the impact of grinding and sieving a 70/140-mesh petroleum coke sample. Specifically, FIG. 5A illustrates the petroleum coke sample 500, while FIG. 5B illustrates the petroleum coke sample 502 after grinding and sieving. As shown in FIG. 5B, the grinding process may cause at least a portion of the particles to undergo a reduction in sphericity. However, we have found that, once the fines are sufficiently removed via air classification, the resulting proppant conductivity was maintained at substantially the same level as the proppant conductivity prior to the size classification process.

To examine the relative importance of grinding, particle shape, and fines content on the resulting conductivity characteristics of the proppant, 40/70-mesh samples of fluid coke and sand were milled with a high-speed crusher operating at 25,000 revolutions per minute (rpm), and the 100-mesh portion of the product was captured via mechanical sieving. These samples were then evaluated for API conductivity under the standard conditions of 150 degrees Fahrenheit (° F.) and 2 lb/ft$^2$ loading. The particle size and shape distributions of each of the samples was characterized with automated digital imaging microscopy. The instrument captures images of the particles in the microscope objective's field of view and converts pixelated two-dimensional images into a series of geometric size and shape descriptors for the imaged particles. Statistical distributions are then generated from the collection of images. A summary of some of the relevant size and shape characteristics are listed in Table 3, where $\sigma_{vol,50}$ and $\overline{\sigma}_{vol}$ are the volume-weighted median and mean circular equivalent diameter (in μm), respectively, and Aspect Ratio$_{50}$ is the volume-weighted median aspect ratio.

TABLE 3

| Material | Sample | $\sigma_{vol,50}$ | $\bar{\sigma}_{vol}$ | Aspect Ratio$_{50}$ |
|---|---|---|---|---|
| Fluid | 100-Mesh | 192.9 | 197.2 | 0.861 |
| Coke | Ground: 40/70-Mesh to 100-Mesh | 212.2 | 214.8 | 0.831 |
| | Ground: 100-Mesh (Fines Removed) | 220.6 | 221.4 | 0.837 |
| Sand | 100-Mesh | 216.2 | 230.3 | 0.764 |
| | Ground: 40/70-Mesh to 100-Mesh | 238.3 | 242.6 | 0.782 |
| | Ground: 100-Mesh (Fines Removed) | 248.1 | 254.4 | 0.781 |

Figure 6B:
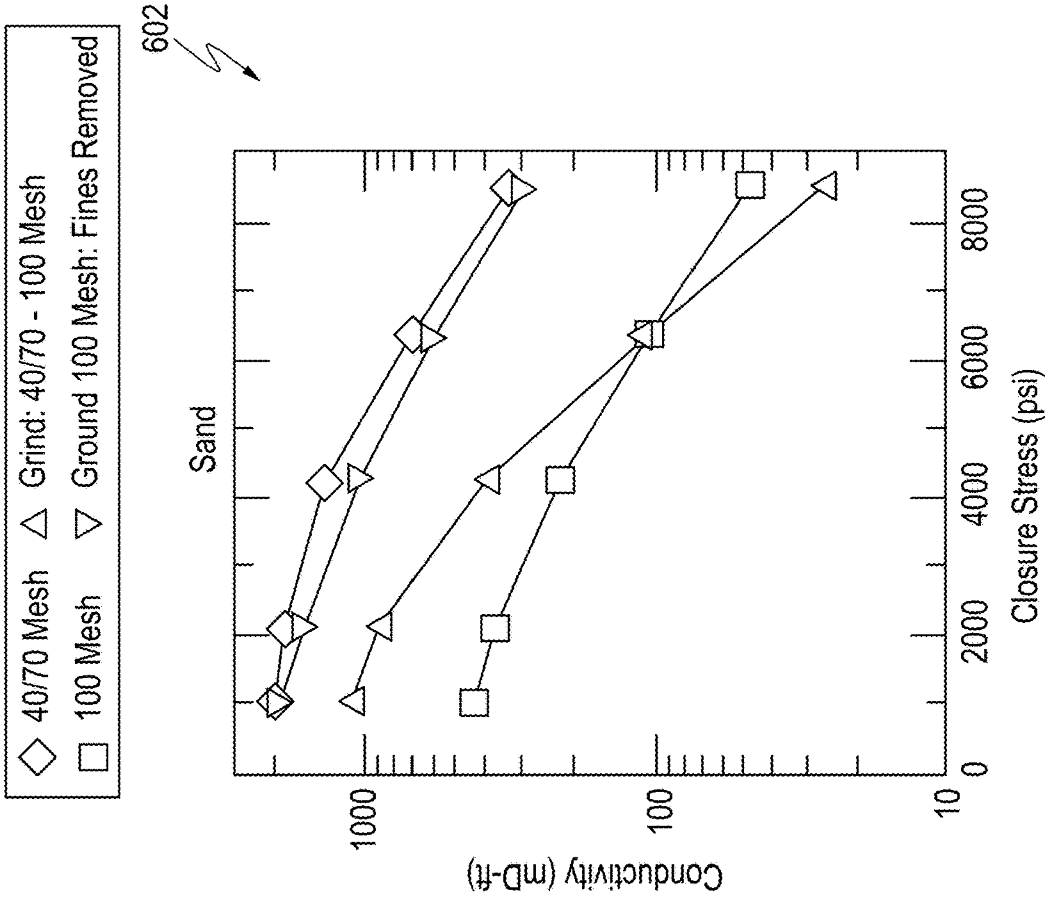
FIG. 6B is a graph showing the conductivity of the sand sample of Table 3.
Figure 6A:
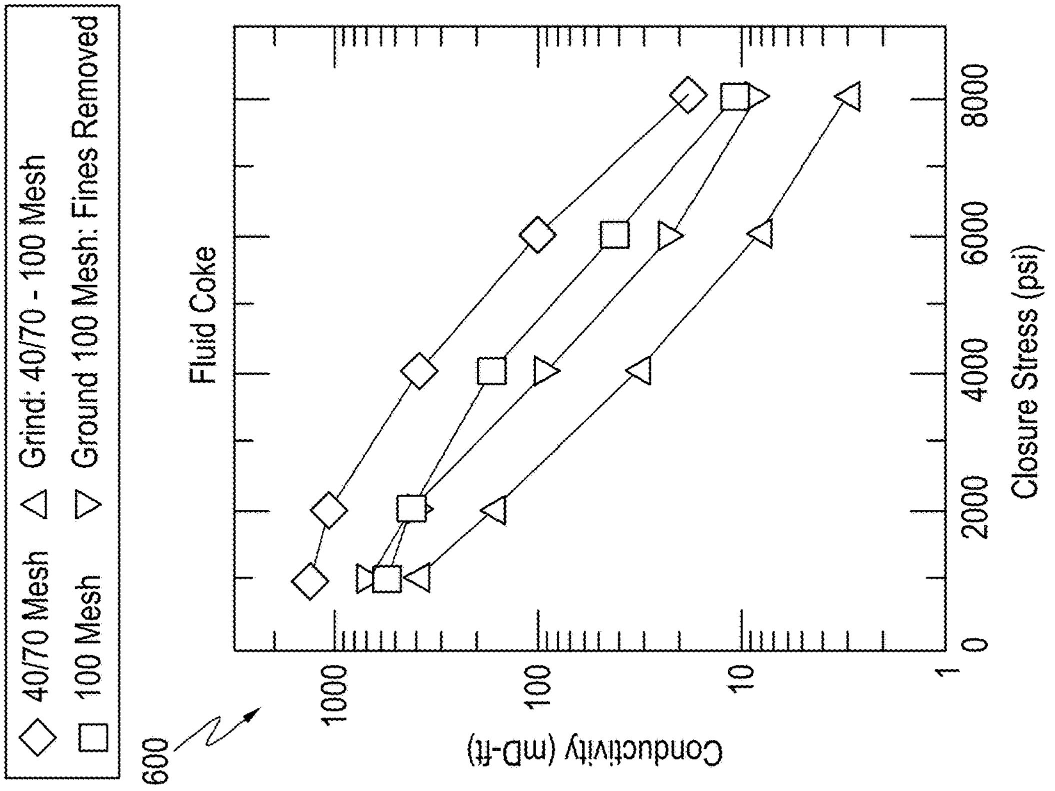
FIG. 6A is a graph showing the conductivity of the fluid coke sample of Table 3.

FIG. 6A is a graph 600 showing the conductivity of the fluid coke sample of Table 3, while FIG. 6B is a graph 602 showing the conductivity of the sand sample of Table 3. More specifically, in each graph 600 and 602, the conductivity (in mD-ft) is shown as a function of the closure stress (in psi) for a 40/70-mesh sample, a ground 40/70-mesh to 100-mesh sample, a 100-mesh sample, and a ground 100-mesh sample (with fines removed). All measurements were performed at 150° F. and 2 lb/ft$^2$ loading. We found the larger-sized fractions possess higher conductivity, and the stress dependence of the conductivity is similar. Comparing the ground 100-mesh fluid coke sample, the one notable difference is that the ground material exhibits much greater degradation in conductivity with stress than the unground counterpart. We also noted that the ground sand sample exhibits higher conductivity at low stresses compared to the unground 100-mesh sample; however, similar to the fluid coke sample, the conductivity degrades with increasing stress to a much larger extent compared to the unground 100-mesh sample.

Figure 7A:
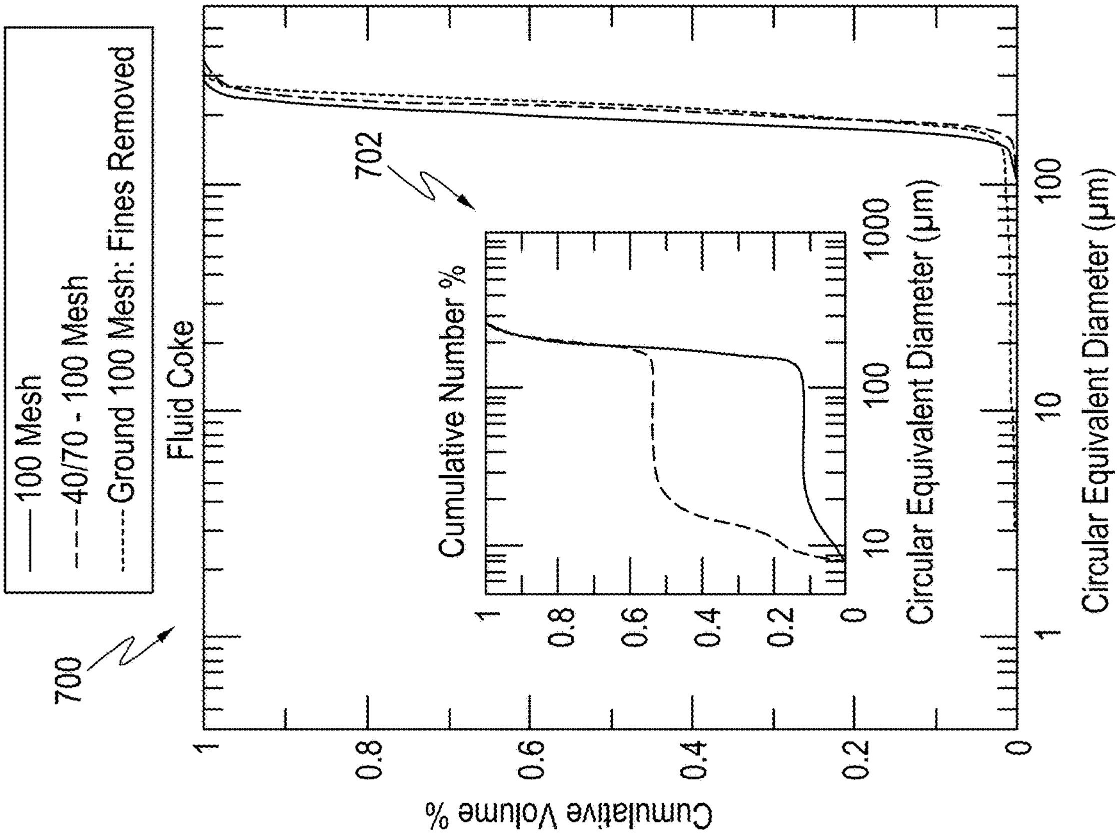
FIG. 7A includes a graph of the volume-weighted cumulative distribution function of the circular equivalent diameter for the fluid coke sample of Table 3 as well as an inset graph of the number-weighted cumulative distribution function of the circular equivalent diameter for the fluid coke sample of Table 3.
Figure 7B:
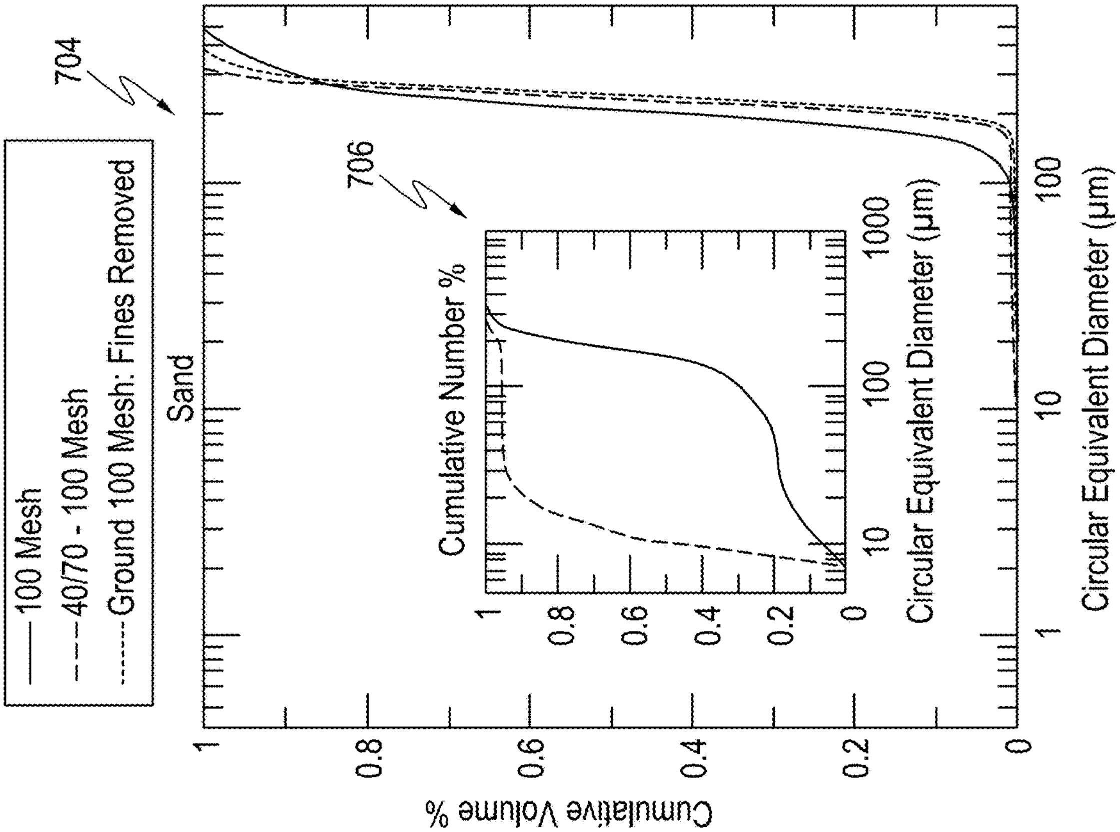
FIG. 7B includes a graph of the volume-weighted cumulative distribution function of the circular equivalent diameter for the sand sample of Table 3 as well as an inset graph of the number-weighted cumulative distribution function of the circular equivalent diameter for the sand sample of Table 3.

FIG. 7A includes a graph 700 of the volume-weighted cumulative distribution function of the circular equivalent diameter for the fluid coke sample of Table 3 as well as an inset graph 702 of the number-weighted cumulative distribution function of the circular equivalent diameter for the fluid coke sample of Table 3, while FIG. 7B includes a graph 704 of the volume-weighted cumulative distribution function of the circular equivalent diameter for the sand sample of Table 3 as well as an inset graph 706 of the number-weighted cumulative distribution function of the circular equivalent diameter for the sand sample of Table 3, where the circular equivalent diameter is computed as the diameter of the circle of equal area to the pixelated area captured for the particle. We observed very little difference in the overall distribution among the nominally 100-mesh ranged fluid coke samples. It is worth noting that the 100-mesh sand sample has a slightly higher degree of polydispersity than the other sand samples, which may partially explain the higher values of conductivity at low stress for the ground sand samples seen in FIG. 6B. Moreover, after examining the distribution functions on a particle number basis, as shown in the inset graphs 702 and 706, we found that a significant number fraction of each ground sample is comprised of very small particles of less than 20 μm in equivalent diameter. While the vast majority of the mass of each sample resides in the 100-mesh range, it is clear when comparing the ground sample fracture conductivity to the unground 100-mesh sample that the presence of the fine particles has a substantial impact on the overall conductivity properties of the sample.

After recognition of this effect, we tested the effect of fines removal through air classification (i.e., in this case, elutriation). A quantity of sample was placed in a vertical tube with 100-mesh screens at the top and bottom of the column, and air was flowed from the bottom to aerosolize and eject the fines. The resulting material that was collected exhibited nearly identical volume-weighted particle size distributions. The inset graphs 702 and 706 of FIGS. 7A and 7B, respectively, show the significant decrease in the number of very small particles in the sample due to the elutriation process. Moreover, the graphs 600 and 602 of FIGS. 6A and 6B show that the conductivity of the ground samples with the fines removed improves markedly, nearly restored to the conductivity of the original unground 100-mesh sample. Accordingly, this data shows that the presence of fines in the initial proppant packing has a large influence on the resulting conductivity.

Figure 8B:
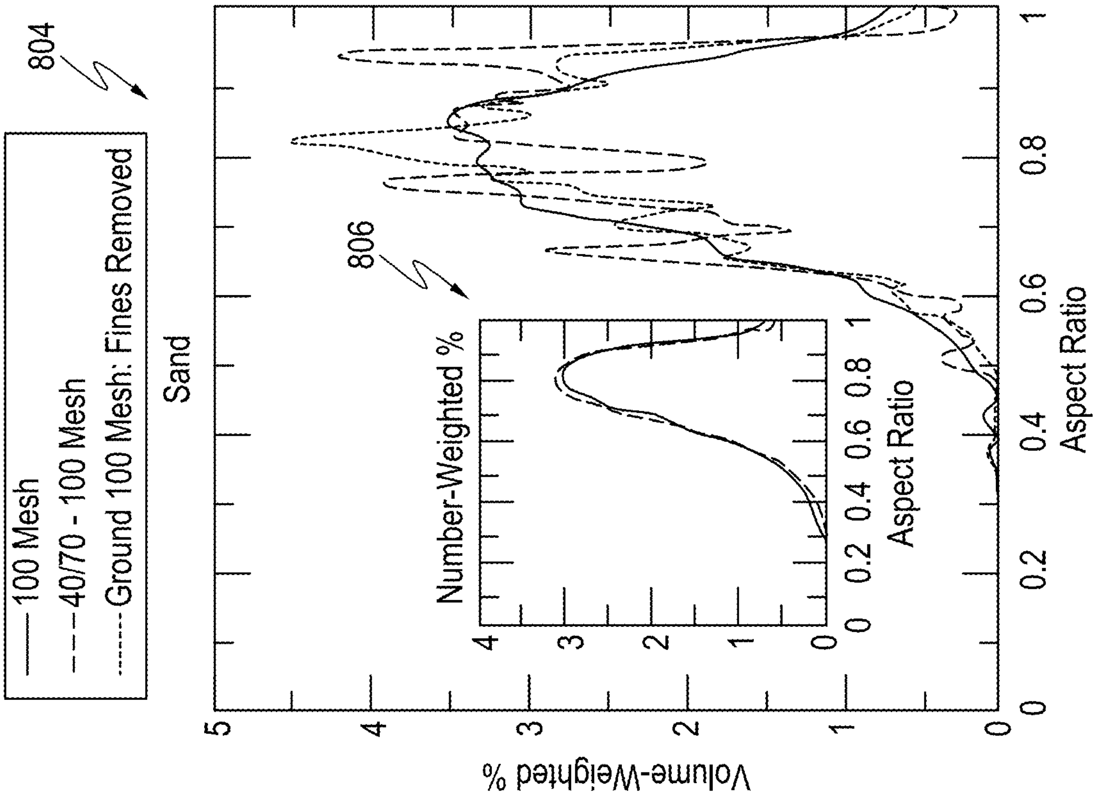
FIG. 8B includes graphs of the volume-weighted and number-weighted distribution functions, respectively, of the particle aspect ratio for the sand sample of Table 3.
Figure 8A:
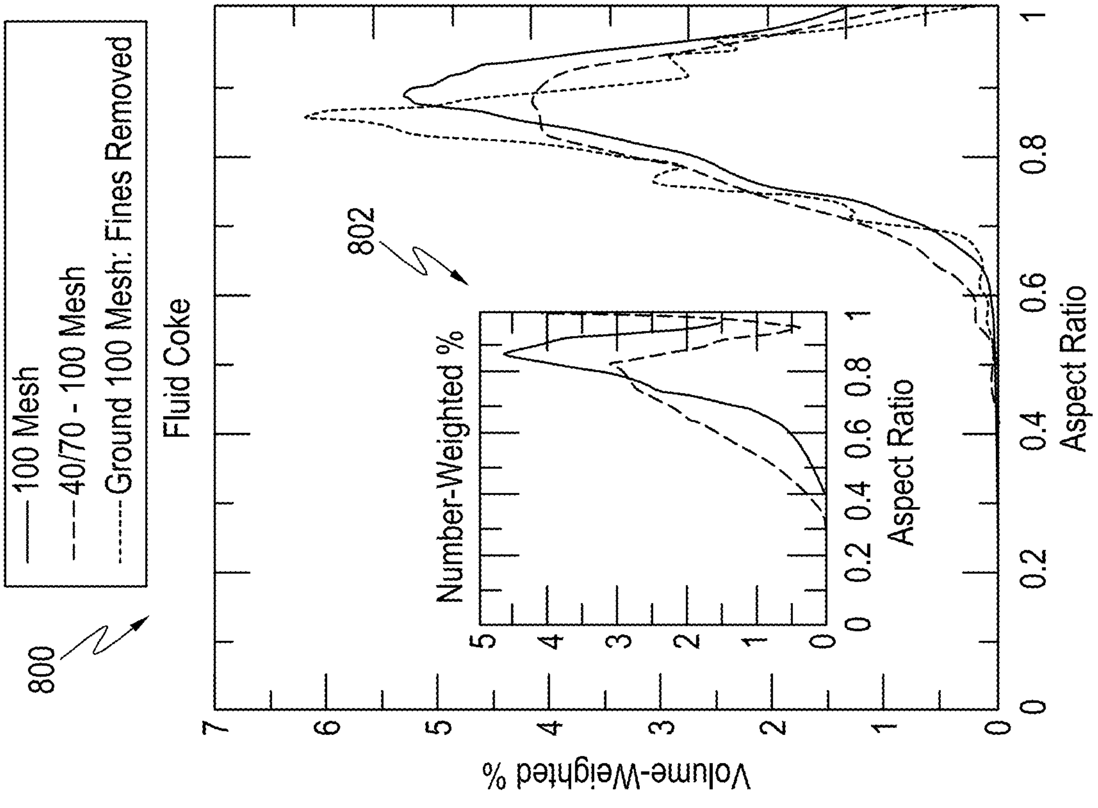
FIG. 8A includes graphs of the volume-weighted and number-weighted distribution functions, respectively, of the particle aspect ratio for the fluid coke sample of Table 3.

FIG. 8A includes graphs 800 and 802 of the volume-weighted and number-weighted distribution functions, respectively, of the particle aspect ratio for the fluid coke sample of Table 3, while FIG. 8B includes graphs 804 and 806 of the volume-weighted and number-weighted distribution functions, respectively, of the particle aspect ratio for the sand sample of Table 3, where the aspect ratio is defined as the width to length of the projected two-dimensional particle image. Based on the graphs 800 and 804, we see that, on a volumetric basis, there is little evidence that the particle shape has a large influence on the conductivity behavior of the samples. In this case, the grinding process produces a population slightly more skewed towards higher elongation, more so for the fluid coke sample than for the sand sample. This also illustrates that each material type (i.e., fluid coke versus sand) possesses its own cleavage pathways when ground and, therefore, should be examined explicitly.

Taken together, we conclude that the main effect of grinding is the introduction of fines in a system that, if retained, can lead to considerable degradation in permeability of the grain pack. Even after grinding, the particle shape distribution does not appear to alter dramatically, and the restoration of conductivity after fines removal would suggest that particle shape is of secondary importance in determining the flow characteristics of fluids through these packings.

Figure 9:
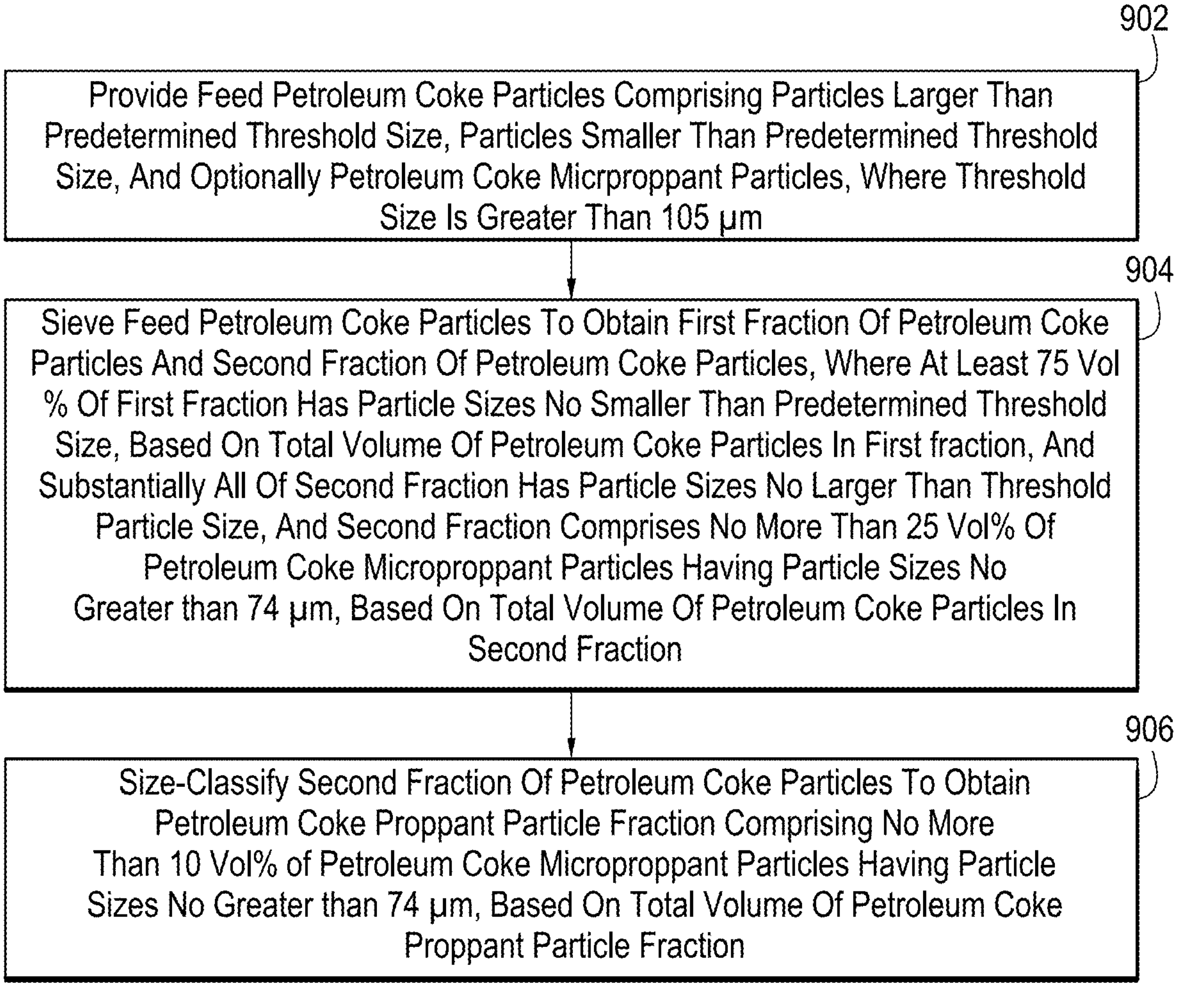
FIG. 9 is a process flow diagram of an exemplary method for preparing petroleum coke proppant particles for hydraulic fracturing.

Turning to details of exemplary methods according to the present disclosure, FIG. 9 is a process flow diagram of an exemplary method 900 for preparing petroleum coke proppant particles for hydraulic fracturing. The method 900 may be performed using feed petroleum coke particles. Such feed petroleum coke particles may include fluid coke, flexicoke, delayed coke, thermally post-treated coke, pyrolysis coke, or any combination thereof. Moreover, such particles may have apparent densities ranging from around 1.0 g/cm$^3$ to around 2.0 g/cm$^3$. In various embodiments, such particles may be obtained from (e.g., produced at or received from) from one or more refineries (e.g., from a fluid coker, flexicoker, delayed coker, or the like) and may or may not be further treated, such by thermal post-treatment, grinding, and/or sieving.

The exemplary method 900 may begin at block 902, at which feed petroleum coke particles may be provided, where such feed petroleum coke particles may comprise particles larger than a predetermined threshold size (i.e., a predetermined sieve size), particles smaller than the predetermined threshold size, and optionally petroleum coke microproppant particles. In various embodiments, the predetermined threshold size may be greater than 105 μm. In some embodiments, the predetermined threshold size may be no higher than 297 μm. Moreover, in some embodiments, at block 902, precursor petroleum coke particles may also be ground to obtain at least a portion of the feed petroleum coke particles.

At block 904, the feed petroleum coke particles may be sieved to obtain a first fraction of petroleum coke particles and a second fraction of petroleum coke particles. At least 75 vol % of the first fraction may have particle sizes no smaller than the predetermined threshold size, based on the total volume of the petroleum coke particles in the first fraction. Substantially all of the second fraction may have particle sizes no larger than the threshold particle size, and the second fraction may comprise no more than 25 vol % of petroleum coke microproppant particles having particle sizes no greater than 74 μm (in some embodiments no more than 25 vol % of petroleum coke microproppant particles having particle sizes no greater than 88 μm; in some other embodiments no more than 25 vol % of petroleum coke microproppant particles having particle sizes no greater than 105 μm), based on the total volume of the petroleum coke particles in the second fraction. In some embodiments, the second fraction may comprise no more than 15 vol % of petroleum coke microproppant particles having particle sizes no greater than 74 μm (in some embodiments no more than 15 vol % of petroleum coke microproppant particles having particle sizes no greater than 88 μm; in some other embodiments no more than 15 vol % of petroleum coke microproppant particles having particle sizes no greater than 105 μm), based on the total volume of the petroleum coke particles in the second fraction. In some embodiments, the second fraction may comprise no more than 10 vol % of petroleum coke microproppant particles having particle sizes no greater than 74 μm (in some embodiments no more than 10 vol % of petroleum coke microproppant particles having particle sizes no greater than 88 μm; in some other embodiments no more than 10 vol % of petroleum coke microproppant particles having particle sizes no greater than 105 μm), based on the total volume of the petroleum coke particles in the second fraction. In some embodiments, the second fraction may comprise no more than 5 vol % of petroleum coke microproppant particles having particle sizes no greater than 74 μm (in some embodiments no more than 5 vol % of petroleum coke microproppant particles having particle sizes no greater than 88 μm; in some other embodiments no more than 5 vol % of petroleum coke microproppant particles having particle sizes no greater than 105 μm), based on the total volume of the petroleum coke particles in the second fraction.

In some embodiments, at block 904, a fourth fraction of petroleum coke particles may be obtained. Such fourth fraction may have an average particle size smaller than an average particle size of the second fraction, and such fourth fraction may comprise petroleum coke microproppant particles at a higher concentration than the second fraction.

In various embodiments, the feed petroleum coke particles may be prevented from contacting with a liquid before and during the performance of block 904. To that end, the feed petroleum coke particles may be prevented from undergoing a dust control process at the one or more refineries, for example. Moreover, the feed petroleum coke particles may be shielded with a cover or otherwise protected from contact with a source of moisture.

At block 906, the second fraction of petroleum coke particles may be size-classified to obtain a petroleum coke proppant particle fraction comprising no more than 10 vol % of petroleum coke microproppant particles having particle sizes no greater than 74 μm, based on the total volume of the petroleum coke proppant particle fraction. In various embodiments, this may be carried out using an air elutriator; a water elutriator, a hydrocyclone, and/or a fluidized bed dryer.

In some embodiments, the petroleum coke proppant particle fraction may comprise no more than 5 vol % of petroleum coke microproppant particles having particle sizes no greater than 74 μm, based on the total volume of the petroleum coke proppant particle fraction. In some such embodiments, the second fraction may comprise no more than 5 vol % of petroleum coke microproppant particles having particle sizes no greater than 88 μm, based on the total volume of the petroleum coke particles in the second fraction. In other such embodiments, the second fraction may comprise no more than 5 vol % of petroleum coke microproppant particles having particle sizes no greater than 105 μm, based on the total volume of the petroleum coke particles in the second fraction.

In some embodiments, the petroleum coke proppant particle fraction may comprise no more than 3 vol % of petroleum coke microproppant particles having particle sizes no greater than 74 μm, based on the total volume of the petroleum coke proppant particle fraction. In some such embodiments, the second fraction may comprise no more than 3 vol % of petroleum coke microproppant particles having particle sizes no greater than 88 μm, based on the total volume of the petroleum coke particles in the second fraction. In other such embodiments, the second fraction may comprise no more than 3 vol % of petroleum coke microproppant particles having particle sizes no greater than 105 μm, based on the total volume of the petroleum coke particles in the second fraction.

In some embodiments, substantially all of the petroleum coke proppant particle fraction may have particle sizes from 74 μm to 210 μm. In other embodiments, substantially all of the petroleum coke proppant particle fraction may have particle sizes from 88 μm to 210 μm. In other embodiments, substantially all of the petroleum coke proppant particle fraction may have particle sizes from 105 μm to 210 μm.

In some embodiments, at block 906, a third fraction of petroleum coke particles may be obtained. Such third fraction may have an average particle size smaller than the average particle size of the petroleum coke proppant particle fraction, and such third fraction may comprise petroleum coke microproppant particles at a higher concentration than the petroleum coke proppant particle fraction.

Those skilled in the art will appreciate that the exemplary method 900 of FIG. 9 is susceptible to modification without altering the technical effect provided by the present disclosure. For example, in some embodiments, one or more blocks may be omitted from the method 900, and/or one or more blocks may be added to the method 900. In practice, the exact manner in which the method 900 is implemented will depend at least in part on the details of the specific implementation.

Figure 10:
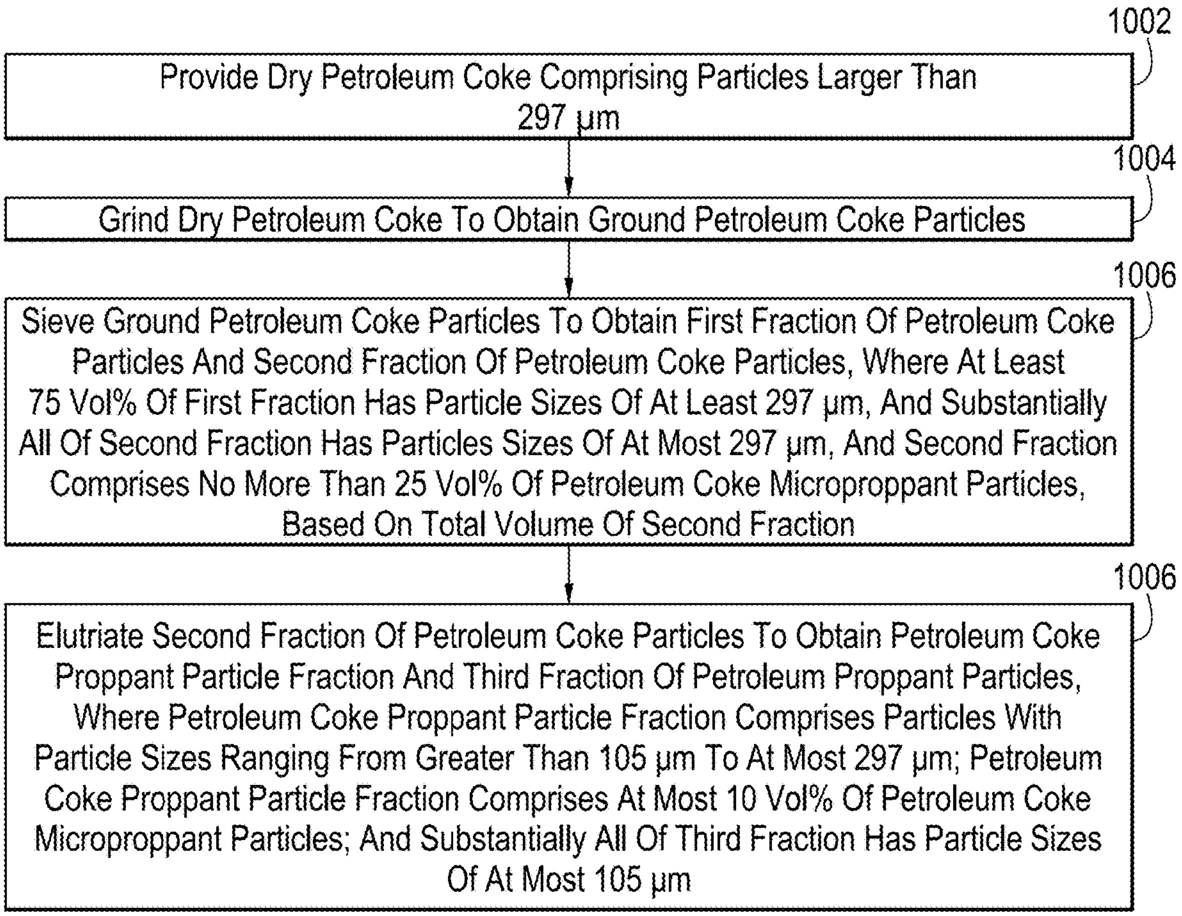
FIG. 10 is a process flow diagram of another exemplary method for preparing petroleum coke proppant particles for hydraulic fracturing.

FIG. 10 is a process flow diagram of another exemplary method 1000 for preparing petroleum coke proppant particles for hydraulic fracturing. The exemplary method 1000 may begin at block 1002, dry petroleum coke comprising particles larger than 297 μm may be provided. The petroleum coke may include fluid coke, flexicoke, delayed coke, thermally post-treated coke, pyrolysis coke, or any combination thereof. Moreover, the petroleum coke particles may have apparent densities ranging from around 1.0 g/cm$^3$ to around 2.0 g/cm$^3$. In various embodiments, such particles may be obtained from (e.g., produced at or received from) from one or more refineries (e.g., from a fluid coker, flexicoker, delayed coker, or the like), or may or may not be further treated, such by thermal post-treatment, grinding, and/or sieving.

At block 1004, the dry petroleum coke may be ground to obtain ground petroleum coke particles.

At block 1006, the ground petroleum coke particles may be sieved to obtain a first fraction of petroleum coke particles and a second fraction of petroleum coke particles. At least 75 vol % of the first fraction may have particle sizes of at least 297 μm, based on the total volume of the first fraction. Substantially all of the second fraction may have particles sizes of at most 297 μm, and the second fraction may comprise no more than 25 vol % of petroleum coke microproppant particles, based on the total volume of the second fraction.

In some embodiments, at least 75 vol % of the first fraction may have particle sizes of at least 250 μm, based on the total volume of the first fraction, and substantially all of the second fraction of petroleum coke particles may have particles sizes of at most 250 μm. In other embodiments, at least 75 vol % of the first fraction may have particle sizes of at least 210 μm, based on the total volume of the first fraction, and substantially all of the second fraction of petroleum coke particles may have particles sizes of at most 210 μm. Moreover, in some embodiments, the second fraction may comprise no more than 15 vol % of petroleum coke microproppant particles, based on the total volume of the second fraction.

At block 1008, the second fraction of petroleum coke particles may be elutriated to obtain a petroleum coke proppant particle fraction and a third fraction of petroleum proppant particles. The petroleum coke proppant particle fraction may have particle sizes ranging from greater than 105 μm to at most 297 μm; the petroleum coke proppant particle fraction may comprise at most 10 vol % of petroleum coke microproppant particles, based on the total volume of the petroleum coke proppant particle fraction; and substantially all of the third fraction may have particle sizes of at most 105 μm. Moreover, in some embodiments, the petroleum coke proppant particle fraction may comprise no more than 5 vol % of petroleum coke microproppant particles, based on the total volume of the petroleum coke proppant particle fraction.

Those skilled in the art will appreciate that the exemplary method 1000 of FIG. 10 is susceptible to modification without altering the technical effect provided by the present disclosure. For example, in some embodiments, one or more blocks may be omitted from the method 1000, and/or one or more blocks may be added to the method 1000. In practice, the exact manner in which the method 1000 is implemented will depend at least in part on the details of the specific implementation.

This disclosure can include one or more of the following non-limiting aspects and/or embodiments:

A1. A method, comprising: (I) providing feed petroleum coke particles comprising particles larger than a predetermined threshold size, particles smaller than the predetermined threshold size, and optionally petroleum coke microproppant particles, wherein the predetermined threshold size is greater than 105 μm; (II) sieving the feed petroleum coke particles to obtain a first fraction of petroleum coke particles and a second fraction of petroleum coke particles, wherein at least 75 vol % of the first fraction has particle sizes no smaller than the predetermined threshold size, based on the total volume of the petroleum coke particles in the first fraction, and substantially all of the second fraction has particle sizes no larger than the threshold particle size, and the second fraction comprises no more than 25 vol % of petroleum coke microproppant particles having particle sizes no greater than 74 μm, based on the total volume of the petroleum coke particles in the second fraction; and (III) size-classifying the second fraction of petroleum coke particles to obtain a petroleum coke proppant particle fraction comprising no more than 10 vol % of petroleum coke microproppant particles having particle sizes no greater than 74 μm, based on the total volume of the petroleum coke proppant particle fraction.

A2. The method of A1, wherein step (I) comprises grinding precursor petroleum coke particles to obtain at least a portion of the feed petroleum coke particles.

A3. The method of A1 or A2, wherein step (III) is carried out using at least one of: an air elutriator; a water elutriator, a hydrocyclone, and a fluidized bed dryer.

A4. The method of any of A1 to A3, wherein the second fraction comprises no more than 15 vol % of petroleum coke microproppant particles having particle sizes no greater than 74 μm, based on the total volume of the second fraction.

A5. The method of A4, wherein the second fraction comprises no more than 15 vol % of petroleum coke microproppant particles having particle sizes no greater than 88 μm, based on the total volume of the petroleum coke particles in the second fraction.

A6. The method of A4, wherein the second fraction comprises no more than 15 vol % of petroleum coke microproppant particles having particle sizes no greater than 105 μm, based on the total volume of the petroleum coke particles in the second fraction.

A7. The method of any of A1 to A6, wherein the petroleum coke proppant particle fraction comprises no more than 5 vol % of petroleum coke microproppant particles having particle sizes no greater than 74 μm, based on the total volume of the petroleum coke proppant particle fraction.

A8. The method A7, wherein the second fraction comprises no more than 5 vol % of petroleum coke microproppant particles having particle sizes no greater than 88 μm, based on the total volume of the petroleum coke particles in the second fraction.

A9. The method of A7, wherein the second fraction comprises no more than 5 vol % of petroleum coke microproppant particles having particle sizes no greater than 105 μm, based on the total volume of the petroleum coke particles in the second fraction.

A10. The method of any of A1 to A9, wherein the predetermined threshold size in step (I) is no higher than 297 μm.

A11. The method of any of A1 to A10, wherein substantially all of the petroleum coke proppant particle fraction has particle sizes from 74 μm to 210 μm.

A12. The method of any of A1 to A10, wherein substantially all of the petroleum coke proppant particle fraction has particle sizes from 88 μm to 210 μm.

A13. The method of any of A1 to A10, wherein substantially all of the petroleum coke proppant particle fraction has particle sizes from 105 μm to 210 μm.

A14. The method of any of A1 to A13, wherein the feed petroleum coke particles in step (I) have an apparent density of from 1.0 grams per cubic centimeter ($g/cm^3$) to 2.0 $g/cm^3$.

A15. The method of any of A1 to A14, wherein the feed petroleum coke particles in step (I) comprise at least one of fluid coke, flexicoke, delayed coke, thermally post-treated coke, and pyrolysis coke.

A16. The method of any of A1 to A15, comprising preventing the feed petroleum coke particles from contacting with a liquid before and during step (II).

A17. The method of any of A1 to A16, wherein in step (III), a third fraction of petroleum coke particles is obtained, and the third fraction has an average particle size smaller than the average particle size of the petroleum coke proppant particle fraction, and the third fraction comprises petroleum coke microproppant particles at a higher concentration than the petroleum coke proppant particle fraction.

A18. The method of any of A1 to A17, wherein in step (II), a fourth fraction of petroleum coke particles is obtained, and the fourth fraction has an average particle size smaller than an average particle size of the second fraction, and the fourth fraction comprises petroleum coke microproppant particles at a higher concentration than the second fraction.

B1. A method, comprising: providing dry petroleum coke comprising particles larger than 297 μm; grinding the dry petroleum coke to obtain ground petroleum coke particles; sieving the ground petroleum coke particles to obtain a first fraction of petroleum coke particles and a second fraction of petroleum coke particles, wherein at least 75 vol % of the first fraction has particle sizes of at least 297 μm, based on the total volume of the first fraction, and substantially all of the second fraction has particles sizes of at most 297 μm, and the second fraction comprises no more than 25 vol % of petroleum coke microproppant particles, based on the total volume of the second fraction; and elutriating the second fraction of petroleum coke particles to obtain a petroleum coke proppant particle fraction and a third fraction of petroleum proppant particles, wherein: the petroleum coke proppant particle fraction has particle sizes ranging from greater than 105 μm to at most 297 μm; the petroleum coke proppant particle fraction comprises at most 10 vol % of petroleum coke microproppant particles, based on the total volume of the petroleum coke proppant particle fraction; and substantially all of the third fraction has particle sizes of at most 105 μm.

B2. The method of B1, wherein: at least 75 vol % of the first fraction has particle sizes of at least 250 μm, based on the total volume of the first fraction; and substantially all of the second fraction of petroleum coke particles has particles sizes of at most 250 μm.

B3. The method of B1 or B2, wherein: at least 75 vol % of the first fraction has particle sizes of at least 210 μm, based on the total volume of the first fraction; and substantially all of the second fraction of petroleum coke particles has particles sizes of at most 210 μm.

B4. The method of any of B1 to B3, wherein the second fraction comprises no more than 15 vol % of petroleum coke microproppant particles, based on the total volume of the second fraction.

B5. The method of any of B1 to B4, wherein the petroleum coke proppant particle fraction comprises no more than 5 vol % of petroleum coke microproppant particles, based on the total volume of the petroleum coke proppant particle fraction.

B6. The method of any of B1 to B5, wherein the dry petroleum coke comprises at least one of fluid coke, flexicoke, delayed coke, thermally post-treated coke, and pyrolysis coke.

While the embodiments described herein are well-calculated to achieve the advantages set forth, it will be appreciated that such embodiments are susceptible to modification, variation, and change without departing from the spirit thereof. In other words, the particular embodiments described herein are illustrative only, as the teachings of the present disclosure may be modified and practiced in different but equivalent manners apparent to those skilled in the art having the benefit of the teachings herein. Moreover, the systems and methods illustratively disclosed herein may suitably be practiced in the absence of any element that is not specifically disclosed herein and/or any optional element disclosed herein. While compositions and methods are described in terms of "comprising" or "including" various components or steps, the compositions and methods can also "consist essentially of" or "consist of" the various components and steps. Indeed, the present disclosure includes all alternatives, modifications, and equivalents falling within the true spirit and scope of the appended claims.

What is claimed is:

1. A method, comprising:

(I) providing feed petroleum coke particles comprising particles larger than a predetermined threshold size, particles smaller than the predetermined threshold size, and optionally petroleum coke microproppant particles, wherein the predetermined threshold size is greater than 105 μm;

(II) sieving the feed petroleum coke particles to obtain a first fraction of petroleum coke particles and a second fraction of petroleum coke particles, wherein at least 75 vol % of the first fraction has particle sizes no smaller than the predetermined threshold size, based on the total volume of the petroleum coke particles in the first fraction, and substantially all of the second fraction has particle sizes no larger than the threshold particle size, and the second fraction comprises no more than 25 vol % of petroleum coke microproppant particles having particle sizes no greater than 74 μm, based on the total volume of the petroleum coke particles in the second fraction; and (III) size-classifying the second fraction of petroleum coke particles to obtain a petroleum coke proppant particle fraction comprising no more than 10 vol % of petroleum coke microproppant particles having particle sizes no greater than 74 μm, based on the total volume of the petroleum coke proppant particle fraction.

2. The method of claim 1, wherein step (I) comprises grinding precursor petroleum coke particles to obtain at least a portion of the feed petroleum coke particles.

3. The method of claim 1, wherein step (III) is carried out using at least one of: an air elutriator; a water elutriator, a hydrocyclone, and a fluidized bed dryer.

4. The method of claim 1, wherein the second fraction comprises no more than 15 vol % of petroleum coke microproppant particles having particle sizes no greater than 74 μm, based on the total volume of the petroleum coke particles in the second fraction.

5. The method of claim 4, wherein the second fraction comprises no more than 15 vol % of petroleum coke microproppant particles having particle sizes no greater than 88 μm, based on the total volume of the petroleum coke particles in the second fraction.

6. The method of claim 4, wherein the second fraction comprises no more than 15 vol % of petroleum coke microproppant particles having particle sizes no greater than 105 μm, based on the total volume of the petroleum coke particles in the second fraction.

7. The method of claim 1, wherein the petroleum coke proppant particle fraction comprises no more than 5 vol % of petroleum coke microproppant particles having particle sizes no greater than 74 μm, based on the total volume of the petroleum coke proppant particle fraction.

8. The method of claim 7, wherein the second fraction comprises no more than 5 vol % of petroleum coke microproppant particles having particle sizes no greater than 88 μm, based on the total volume of the petroleum coke particles in the second fraction.

9. The method of claim 7, wherein the second fraction comprises no more than 5 vol % of petroleum coke microproppant particles having particle sizes no greater than 105 μm, based on the total volume of the petroleum coke particles in the second fraction.

10. The method of claim 1, wherein the predetermined threshold size in step (I) is no higher than 297 μm.

11. The method of claim 1, wherein substantially all of the petroleum coke proppant particle fraction has particle sizes from 74 μm to 210 μm.

12. The method of claim 1, wherein substantially all of the petroleum coke proppant particle fraction has particle sizes from 88 μm to 210 μm.

13. The method of claim 1, wherein substantially all of the petroleum coke proppant particle fraction has particle sizes from 105 μm to 210 μm.

14. The method of claim 1, wherein the feed petroleum coke particles in step (I) have an apparent density of from 1.0 grams per cubic centimeter ($g/cm^3$) to 2.0 $g/cm^3$.

15. The method of claim 1, wherein the feed petroleum coke particles in step (I) comprise at least one of fluid coke, flexicoke, delayed coke, thermally post-treated coke, and pyrolysis coke.

16. The method of claim 1, comprising preventing the feed petroleum coke particles from contacting with a liquid before and during step (II).

17. The method of claim 1, wherein in step (III), a third fraction of petroleum coke particles is obtained, and the third fraction has an average particle size smaller than the average particle size of the petroleum coke proppant particle fraction, and the third fraction comprises petroleum coke microproppant particles at a higher concentration than the petroleum coke proppant particle fraction.

18. The method of claim 1, wherein in step (II), a fourth fraction of petroleum coke particles is obtained, and the fourth fraction has an average particle size smaller than an average particle size of the second fraction, and the fourth fraction comprises petroleum coke microproppant particles at a higher concentration than the second fraction.

19. The method of claim 1, wherein the second fraction comprises no more than 25 vol % of petroleum coke microproppant particles having particle sizes no greater than 88 μm, based on the total volume of the petroleum coke particles in the second fraction.

20. The method of claim 1, wherein the second fraction comprises no more than 25 vol % of petroleum coke microproppant particles having particle sizes no greater than 105 μm, based on the total volume of the petroleum coke particles in the second fraction.

21. The method of claim 1, wherein the second fraction comprises no more than 15 vol % of petroleum coke microproppant particles having particle sizes no greater than 74 μm, based on the total volume of the petroleum coke particles in the second fraction.

22. The method of claim 1, wherein the second fraction comprises no more than 15 vol % of petroleum coke microproppant particles having particle sizes no greater than 88 μm, based on the total volume of the petroleum coke particles in the second fraction.

23. The method of claim 1, wherein the second fraction comprises no more than 15 vol % of petroleum coke microproppant particles having particle sizes no greater than 105 μm, based on the total volume of the petroleum coke particles in the second fraction.

24. The method of claim 1, wherein the second fraction comprises no more than 5 vol % of petroleum coke microproppant particles having particle sizes no greater than 74 μm, based on the total volume of the petroleum coke particles in the second fraction.

25. The method of claim 1, wherein the second fraction comprises no more than 5 vol % of petroleum coke microproppant particles having particle sizes no greater than 88 μm, based on the total volume of the petroleum coke particles in the second fraction.

26. The method of claim 1, wherein the second fraction comprises no more than 5 vol % of petroleum coke microproppant particles having particle sizes no greater than 105 μm, based on the total volume of the petroleum coke particles in the second fraction.

27. A method, comprising:

providing dry petroleum coke comprising particles larger than 297 μm;

grinding the dry petroleum coke to obtain ground petroleum coke particles;

sieving the ground petroleum coke particles to obtain a first fraction of petroleum coke particles and a second fraction of petroleum coke particles, wherein at least 75 vol % of the first fraction has particle sizes of at least 297 μm, based on the total volume of the first fraction, and substantially all of the second fraction has particles sizes of at most 297 μm, and the second fraction comprises no more than 25 vol % of petroleum coke microproppant particles, based on the total volume of the second fraction; and elutriating the second fraction of petroleum coke particles to obtain a petroleum coke proppant particle fraction and a third fraction of petroleum proppant particles, wherein:

the petroleum coke proppant particle fraction has particle sizes ranging from greater than 105 μm to at most 297 μm;

the petroleum coke proppant particle fraction comprises at most 10 vol % of petroleum coke microproppant particles; and substantially all of the third fraction has particle sizes of at most 105 μm.

28. The method of claim 27, wherein:

at least 75 vol % of the first fraction has particle sizes of at least 250 μm, based on the total volume of the first fraction; and substantially all of the second fraction of petroleum coke particles has particles sizes of at most 250 μm.

29. The method of claim 27, wherein:

at least 75 vol % of the first fraction has particle sizes of at least 210 μm, based on the total volume of the first fraction; and substantially all of the second fraction of petroleum coke particles has particles sizes of at most 210 μm.

30. The method of claim 27, wherein the second fraction comprises no more than 15 vol % of petroleum coke microproppant particles, based on the total volume of the second fraction.

31. The method of claim 27, wherein the petroleum coke proppant particle fraction comprises no more than 5 vol % of petroleum coke microproppant particles, based on the total volume of the petroleum coke proppant particle fraction.

32. The method of claim 27, wherein the dry petroleum coke comprises at least one of fluid coke, flexicoke, delayed coke, thermally post-treated coke, and pyrolysis coke.

* * * * *